United States Patent
Talur et al.

(10) Patent No.: US 12,463,907 B2
(45) Date of Patent: Nov. 4, 2025

(54) VALIDATING NETWORK FLOWS IN A MULTI-TENANTED NETWORK APPLIANCE ROUTING SERVICE

(71) Applicant: Amazon Technologies, Inc., Seattle, WA (US)

(72) Inventors: Dheerendra Talur, Sammamish, WA (US); Milind Madhukar Kulkarni, Sammamish, WA (US); Lee Spencer Dillard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 525 days.

(21) Appl. No.: 16/917,804

(22) Filed: Jun. 30, 2020

(65) Prior Publication Data

US 2021/0409336 A1 Dec. 30, 2021

(51) Int. Cl.
*H04L 47/2441* (2022.01)
*H04L 45/00* (2022.01)
*H04L 47/32* (2022.01)

(52) U.S. Cl.
CPC .......... *H04L 47/2441* (2013.01); *H04L 45/38* (2013.01); *H04L 47/32* (2013.01)

(58) Field of Classification Search
CPC ...... H04L 47/2441; H04L 47/32; H04L 45/38
See application file for complete search history.

(56) References Cited

U.S. PATENT DOCUMENTS

| | | | |
|---|---|---|---|
| 6,760,775 | B1 | 7/2004 | Anerousis |
| 6,798,775 | B1 | 9/2004 | Bordonaro |
| 8,854,972 | B1 | 10/2014 | Li |

(Continued)

FOREIGN PATENT DOCUMENTS

| | | |
|---|---|---|
| CN | 202010354728 | 4/2020 |
| EP | 4173261 | 5/2023 |

(Continued)

OTHER PUBLICATIONS

U.S. Appl. No. 16/917,788, filed Jun. 30, 2020.

(Continued)

*Primary Examiner* — Derrick W Ferris
*Assistant Examiner* — Keith Follansbee
(74) *Attorney, Agent, or Firm* — Knobbe, Martens, Olson & Bear, LLP

(57) ABSTRACT

Systems and methods are provided to add flow validation information to packets of network traffic. Each packet can have flow validation information added corresponding to the source and destination of the packet. A stateful network routing service may intercept packets and obtain or generate flow validation information based on the source and destination of the packet. The stateful network routing service may add the information to the packet and transmit the enriched packet to a network appliance. The stateful network routing service may receive a second enriched packet from the network appliance. The stateful network routing service can compare the enriched packet with the second enriched packet. Based on the comparison of the enriched packets, the stateful network routing service can determine whether the packet should be transmitted to the destination or dropped.

17 Claims, 13 Drawing Sheets

(56) References Cited

U.S. PATENT DOCUMENTS

| | | | |
|---|---|---|---|
| 8,990,430 B2* | 3/2015 | Smith | H04L 49/552 |
| | | | 709/249 |
| 9,047,306 B1* | 6/2015 | Frolund | G06F 16/178 |
| 9,239,738 B2 | 1/2016 | Hegde | |
| 9,398,121 B1* | 7/2016 | Brandwine | H04L 69/24 |
| 9,668,161 B2* | 5/2017 | Kavunder | H04W 28/0215 |
| 9,807,057 B1 | 10/2017 | Deb | |
| 10,257,167 B1* | 4/2019 | Matthews | H04L 12/4641 |
| 10,320,568 B1 | 6/2019 | Mao | |
| 10,623,308 B2 | 4/2020 | Singh | |
| 11,088,948 B1 | 8/2021 | Talur | |
| 11,184,277 B1 | 11/2021 | Talur | |
| 11,194,688 B1 | 12/2021 | Featonby | |
| 11,310,149 B1 | 4/2022 | Deb et al. | |
| 11,388,277 B2 | 7/2022 | Kim | |
| 11,595,307 B1 | 2/2023 | Talur et al. | |
| 11,652,736 B2 | 5/2023 | Talur et al. | |
| 2004/0210670 A1 | 10/2004 | Anerousis | |
| 2014/0337500 A1* | 11/2014 | Lee | H04L 41/26 |
| | | | 709/223 |
| 2014/0341030 A1* | 11/2014 | Kuo | H04L 49/35 |
| | | | 370/235 |
| 2015/0092551 A1 | 4/2015 | Moisand | |
| 2015/0295831 A1* | 10/2015 | Kumar | H04L 61/2514 |
| | | | 370/235 |
| 2015/0358284 A1* | 12/2015 | Arkko | H04L 63/0227 |
| | | | 726/13 |
| 2016/0234083 A1* | 8/2016 | Ahn | H04L 61/2567 |
| 2017/0034049 A1 | 2/2017 | Pfaff | |
| 2017/0063681 A1 | 3/2017 | Kaplan | |
| 2017/0346726 A1* | 11/2017 | Menon | H04L 45/22 |
| 2017/0359258 A1 | 12/2017 | Flanagan | |
| 2018/0077051 A1 | 3/2018 | Nalnar et al. | |
| 2018/0241664 A1 | 8/2018 | Singh | |
| 2019/0116118 A1 | 4/2019 | Kapela | |
| 2019/0149587 A1 | 5/2019 | Klaghofer | |
| 2019/0199636 A1 | 6/2019 | Narayanan | |
| 2019/0386913 A1 | 12/2019 | Wei | |
| 2020/0028758 A1 | 1/2020 | Tollet | |
| 2020/0059370 A1 | 2/2020 | Abraham | |
| 2020/0067733 A1 | 2/2020 | Hira | |
| 2020/0252239 A1* | 8/2020 | Lee | H04L 67/02 |
| 2020/0336420 A1 | 10/2020 | Joshi | |
| 2021/0359939 A1* | 11/2021 | Wan | H04L 47/2441 |
| 2022/0027244 A1 | 1/2022 | Krishnan | |
| 2022/0086092 A1 | 3/2022 | Li | |
| 2023/0045247 A1 | 2/2023 | Talur et al. | |
| 2023/0171194 A1 | 6/2023 | Talur et al. | |

FOREIGN PATENT DOCUMENTS

| | | |
|---|---|---|
| WO | WO 2021/217872 A1 | 11/2021 |
| WO | WO 2022/005992 A1 | 1/2022 |

OTHER PUBLICATIONS

U.S. Appl. No. 17/033,273, filed Sep. 25, 2020.
International Search Report and Written Opinion issued in PCT/US2021/039411, dated Oct. 20, 2021.
"Azure Load Balancer" http://gowie.eu/index.php/load-balancer.
"MicrosoftDocs / azure-docs" https://github.com/MicrosoftDocs/azure-docs/blob/main/articles/load-balancer/load-balancer-distribution-mode.md.
"Manage virtual network: Load balancer distribution mode (Source IP Affinity)" https://github.com/Huachao/azure-content/blob/master/articles/virtual-network/virtual-networks-load-balancer-manage-distribution-mode-source-ip.md.
Yves Pitsch, "Azure Load Balancer new distribution mode", Oct. 30, 2014 https://azure.microsoft.com/en-us/blog/azure-load-balancer-new-distribution-mode/.
International Preliminary Report on Patentability issued in PCT/US/2021/039411, dated Jan. 12, 2023.
Talur et al., U.S. Appl. No. 18/160,823, filed Jan. 27, 2023.

* cited by examiner

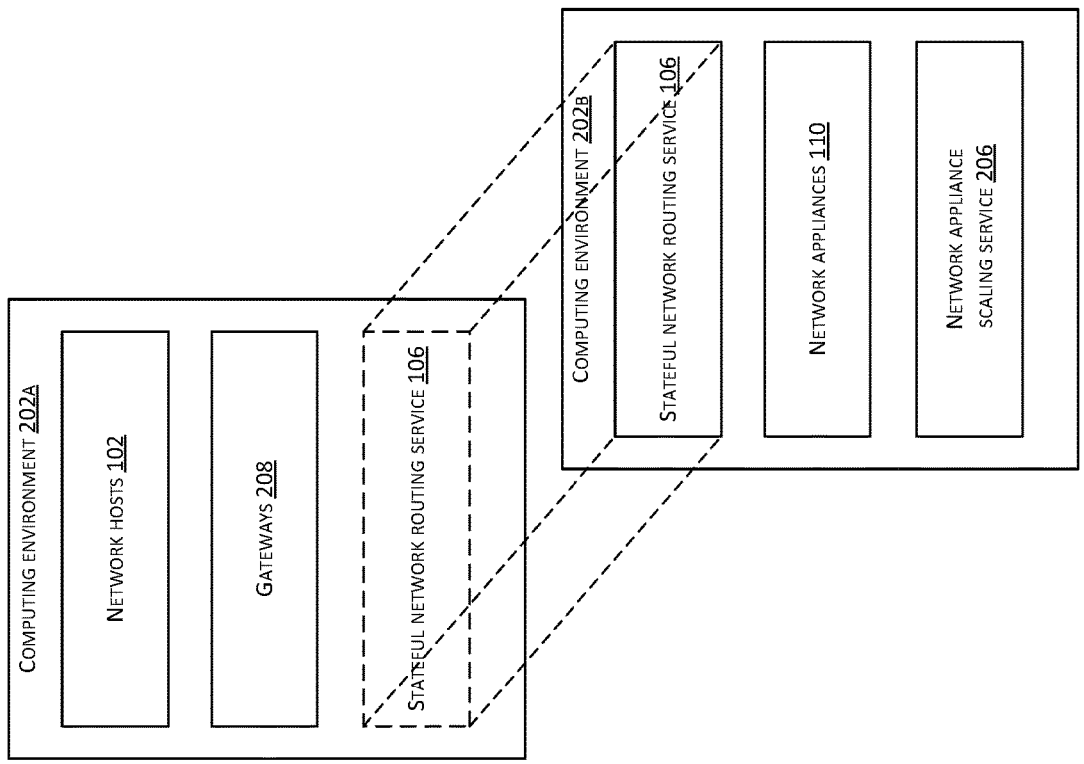

400B

| Destination | Next-Hop |
|---|---|
| 192.0.0.0/24 | Stateful network routing service pool #1 |
| 192.0.1.0/24 | Stateful network routing service pool #2 |
| 192.0.2.0/24 | Stateful network routing service pool #3 |
| 192.0.3.0/24 | Stateful network routing service pool #4 |

VALIDATING NETWORK FLOWS IN A MULTI-TENANTED NETWORK APPLIANCE ROUTING SERVICE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Somewhat similar, network virtualization technologies exist that allow for creation of virtualized network environments at a virtualization host computing device, or on multiple virtualization host computing devices connected via a physical substrate network. Virtualized network environments can operate in a manner logical similar or equivalent to a corresponding physical network, but may be created, maintained, deleted, or otherwise managed via software. Moreover, a single virtualization host device or physical substrate network can host multiple virtualized network environments.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 3 depicts a schematic diagram of networked environments according to some embodiments.

FIG. 4B is a pictorial diagram depicting a route table in accordance with aspects of the present disclosure.

DETAILED DESCRIPTION

Figure 1A:
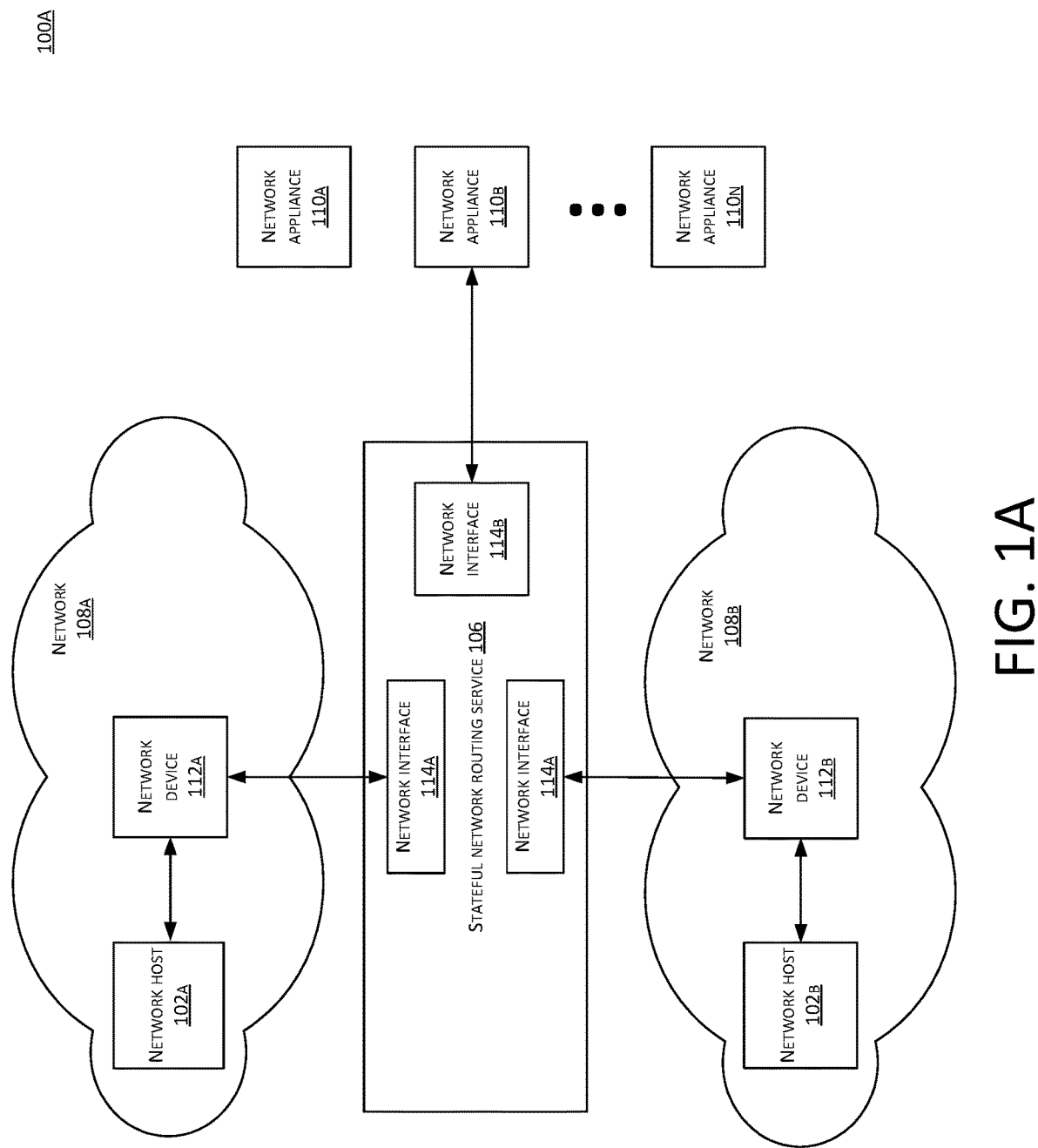
FIG. 1A depicts a schematic diagram of an example networked environment according to some embodiments.

The present disclosure generally relates to a managed service that makes it easy for customers of a cloud provider network to deploy, manage, and use a fleet of virtual network appliances in a scalable, secure, and fault-tolerant manner. For example, the fleet of virtual network appliances may be horizontally scalable, and may be multi-tenant in that it is shared across a number of different customers. Customers may insert such network appliances inline, such that traffic flowing from a source to a destination flows through the network appliance. Such network appliances can perform actions such as security inspection, compliance, policy controls, and other networking services. Typically, such network appliances do not scale and do not support high availability beyond a single availability zone, and can involve complexity that increases the possibility of errors, accidental exfiltration of sensitive data, and inbound security attacks. Existing network appliances can also introduce a single point of failure into network traffic flows. The disclosed managed appliance gateway service addresses these challenges, among others, by (1) providing elastic scalability of a fleet of network appliances as traffic volume changes, (2) automatically rerouting traffic to healthy appliances, (3) performing graceful failover among appliances during maintenance events, and (4) providing secure managed traffic steering to maintain security boundaries between different customers' traffic flows. Implementations of the managed appliance gateway service may process per packet at layer 3 (of the OSI model) in a manner agnostic to appliance states, so that any type of third-party network appliance can be deployed in fleet behind the appliance gateway. In this manner, the appliance gateway can act as a combination of a layer 3 router and layer 4 load balancer.

Aspects relate to providing and managing access to network appliances for virtualized network environments, which appliances provide networking services to network hosts in those virtualized network environments (these environments to which services are provided by a network appliance are generally referred to herein as "serviced environments"), where the network appliances exist external to such serviced environments. More specifically, as disclosed herein, managing access to a network appliance external to serviced environments can enable multi-tenancy on the appliance, such that a single network appliance provide services to multiple serviced environments. The embodiments described herein can provide for efficient, resilient and secure routing of traffic for serviced environments, by providing a stateful network routing service configured to obtain traffic stemming from or addressed to a serviced environment and to route such traffic to an appropriate network appliance.

When routing such data, the stateful network routing service can utilize network virtualization technologies to ensure that such routing occurs transparently to the serviced environment, without interfering with normal network communications. To support use of such virtualization technologies, the stateful network routing service can maintaining state data identifying particular "flows" of traffic through the routings service, each of which generally represents a related set of traffic (e.g., sharing a source network address and a destination network address, among other parameters). The stateful network routing service can further maintain routing rules describing how to route packets corresponding to a given flow, such that flows are routed to an appropriate appliance for processing, and later on to their intended destination.

For example, assume a flow exists between a first device within a serviced environment and a second device external to the serviced environment. Further assume that the serviced environment is configured such that all traffic of this flow is to be rerouted to a network appliance. The stateful routing service may therefore maintain a routing rule that states that traffic from the first device to the second device should be routed from the routing service to the network appliance. This rule may be stated in terms of source and destination addresses for both incoming packets and outgoing packets, in the form of "source_ip/destination_ip=>new_source_ip/new_destination_ip", where "source_ip" is the network address from which the packet is received, "destination_ip" is the address to which the packet is addressed, "new_source_ip" is the new source address that should be indicated, and "new_destination_ip" is the new address to which the packet should be written. As such, a rule that states that traffic from the first device to the second device should be routed from the routing service to the network appliance may be phrased as "first_device/second_device=>stateful_routing_service/network_appliance." While these rules are explained in terms of original and new source and destination addresses for the sake of simplicity, in practice multiple parameters may be used to define either original or rewritten values, including (but not limited to) source port, destination port, protocol type, class of service, or the like. A combination of such parameters may in some instances be referred to as a "tuple." As such, rules may be defined as "original tuple=>new tuple," such that incoming packets that match "original tuple" are to be sent out with a header matching "new tuple." In some instances, encapsulation may be used such that the original tuple is maintained within an encapsulated packet header, with an outer packet header set to values of the new tuple.

In some cases, the number of rules required to manage flows by the stateful network routing service may be large. For example, the stateful routing service may service thousands, tens of thousands, etc., flows and thus be required to store a significant number of routing rules. This requirement may be exacerbated by the fact that each logical communication path serviced by the network appliance (e.g., from a source device in a serviced environment to a destination device) may in fact be represented as two flows: a flow between the source device and an appliance, and a flow between the appliance and the destination device. In addition, the logical communication path flowing from the serviced environment (the egress path) may be handled separately from the logical communication path flowing into the serviced environment (the ingress path). As a result, the stateful routing service may manage, for each communication between a source and destination device, four flows of communication and four associated routing rules, potentially overloading memory requirements of the routing service.

In accordance with embodiments of the present disclosure, the number of rules needed by a stateful network routing service may be reduced by removing a need to maintain rules for routing data obtained from network appliances. More particularly, and as discussed in more detail below, when an appliance operates between two devices (e.g., a first device within a serviced environment and a second device external to the serviced environment), the appliance can be configured to operate transparently to those two devices. Accordingly, data transmitted from the appliance to the second device may be indicated to originate from the first device, and vice versa. To facilitate routing from the appliance to the stateful routing service, the appliance can encapsulate data packets. Such encapsulation can be used to "wrap up" the packet intended to be sent to the first or second device, such that on receiving the packet, the routing service can "unwrap" (decapsulate) the packet and transmit it on to the first or second device. As such, the appliance may encapsulate data such that an inner packet (the encapsulated packet) has a destination address of the second device (for example) while an outer packet, which is routed over the network, has a destination address of the stateful network routing service. To reduce an amount of state information maintained by the stateful network routing service, the routing service can provide a specific interface on which encapsulated traffic is received. Rather than storing rules for routing traffic obtained on that interface, the stateful network routing service may rely on the encapsulation expected for that traffic to determine how to route that traffic. For example, rather than storing a rule in the form of "network_appliance/stateful_routing_service=>second_device/first_device" (indicating that traffic from the appliance to the routing service should sent to the first device and indicated to originate from the second device), the routing service may instead decapsulate such packet to reveal an inner packet addressed to the first device and indicated to originate from the source device. The stateful routing service may then rely on the information of that inner packet (potentially with validation, as discussed below) to route that packet, without the need to store a rule for such a packet. As such, the number of routing rules stored at the routing service can be significantly reduced.

As discussed above, appliances in accordance with embodiments of the present disclosure can be multi-tenanted, servicing traffic from multiple serviced environments which can correspond to different customers. The privacy of information in each environment may be of utmost importance, and as such, the stateful network routing service can implement techniques to ensure that an appliance does not inadvertently permit "cross traffic" between environments. Specifically, in some embodiments, the stateful network routing service may use information regarding these flows to conduct error checking with respect to network appliances, to ensure security of a flow at a given appliance (and particularly in multi-tenanted appliances). For example, the stateful network routing service may include, in each packet of a given flow of data passed to a multi-tenanted appliance, a randomly selected value corresponding to the flow as flow validation information. The stateful network routing service may ensure that any packets obtained from the multi-tenanted appliance also contains this value, thus ensuring that errors on the appliance did not cause traffic of one flow to be returned as part of a different flow. Thus, security when using multi-tenanted network appliances can be increased.

Because any computing system is subject to potential failure, providers of appliances may include multiple redundant appliances, any of which may be valid targets for receiving traffic from a serviced environment. These appliances may be distributed among multiple distinct networks. For example, a network environment for a set of appliances may include threes sub-environments (e.g., sub-networks, or "subnets"). In some instances, each sub-environment may be logically or physically isolated from other sub-environments, such that failures that occur in one environment are unlikely or unable to cause failures in another environment. Each sub-environment may include a stateful network routing service operating in accordance with the present disclosure, again providing resiliency of operation. Accordingly, it may be desirable to have traffic of a serviced environment routed to a given sub-environment, and for that traffic to be re-routed to a different sub-environment should the given sub-environment fail.

Accordingly, each routing device handling traffic to or from the serviced environment may manage access to network appliances provided by the providers of the appliances and may be informed of the set of sub-environments that include appliances providing a service to the serviced environment. These routing devices may include, for example, a gateway within the serviced environment configured to route traffic exiting the environment as well as one or more gateways of other networks configured to route traffic entering the serviced environment (e.g., gateways of other serviced environments, edge routers to other networks, etc.). On way to inform each such routing device of the sub-environments that include appliances may be to manually inform each routing service about each sub-environment, so that each such routing device may route flows among the sub-environments and the network appliances. Illustratively, an operator of the fleet of appliances or of the serviced environment may maintain a list of sub-environments including appliances. However, manual configuration may be undesirable. For example, a failure of a network sub-environment and/or the stateful network routing service in that environment, may require a manual change in the routing information for the serviced environment to be propagated to each routing device. Without being manually informed about the failure, each routing device may continue to route flows to the failed network sub-environment and/or failed stateful network routing service. Additionally, such issues may be exacerbated as multiple flows may be routed to the same sub-environment and/or the same stateful network routing service. As a result, manually informing each routing device about a failure of a network sub-environment and/or a stateful network routing service may consume a large amount of network resources and/or require more frequent interactions with the user.

In accordance with embodiments of the present disclosure, the amount of network resources consumed when a failure occurs at a network sub-environment and/or a stateful network routing service, and the level of user interaction required to correct routing under such a failure, may be reduced by enabling routing devices that route traffic into or out of a serviced environment to maintain a routing table that identifies a fleet of appliance as a single network destination, even when such a fleet is spread across multiple environments. For example, rather than routing a flow to a specific stateful network routing service in a given network environment, each routing device may be configured hold a routing table that identifies a "pool" of stateful network routing services spread across multiple environments as a "next hop" destination for routing traffic of a serviced environment. In order to route the traffic to a stateful network routing service, the routing device may resolve that "next hop" into a specific network environment and associated stateful network routing service at a time of routing.

The resolution of a pool of stateful network routing services to a specific stateful network routing service may be periodically or otherwise updated, such that a failure in a given routing service (or its environment) results in re-routing by the network device. For example, a network device may actively determine stateful network routing services that are available and/or healthy. For example, the network device may determine that a stateful network routing service is no longer available and therefore, the network device may remove the stateful network route from the pool of network appliances and may not transmit packets of network traffic to the stateful network routing service. Therefore, each network device may be capable of error checking and handling failover of the flow.

FIG. 1A illustrates an example environment 100A in which a stateful network routing service 106 may be implemented according to some embodiments, enabling traffic from serviced environments to be routed to network appliances 110. The stateful network routing service 106 may be referred to as an "appliance gateway" in some implementations. The example environment 100 may include one or more network hosts 102A, 102B (e.g., a source network host 102A and/or a destination network host 102B) that exist within distinct networks 108A and 108B (each a respective network environment), one or more network devices 112, one or more network appliances 110, and a stateful network routing service 106 with one or more network interfaces 114.

The environments 100A, 100B can be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, such as the stateful network routing service 106, and which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. Each network 108A and 108B illustratively represents a distinct network environment. In one embodiment, either or both networks 108A and 108B are virtualized networks logically implemented by a physical network referred to as the substrate, which includes physical network hardware such as routers, switches, network address translators (NATs), and so on, as well as the physical connections among the devices. For example, either or both networks 108A and 108B may represent a virtual private network environment (or "VPE"). Generally described, a VPE can represent a virtualized computing network (hosted by a virtualization host device or multiple virtualization host devices on a physical network) that enables devices connected (or "inside") the VPE to communicate as if they were connected to one another via a physical local area network (LAN). VPEs may in some instances be referred to as "virtual private clouds" ("VPCs"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network.

Each network 108A and 108B can logically include one or more hosts 102A, 102B, which represent computing devices operating within the network. Network hosts 102A, 102B may be physical devices, or logical devices implemented on underlying physical computing devices. For example, network hosts 102A, 102B may represent virtualized devices provided by a hosted computing environment, which may also be referred to as a "cloud computing environment." Such an environment can include a number of dynamically provisioned and released computing resources. Unless otherwise stated, the term "host" or "network host," as used herein, is intended to refer to a computer or computing device connected to and participating in a network, including servers and clients. For avoidance of ambiguity, it is noted that the term "host" may have other meanings in other contexts. For example, in the virtualization context, a "host device" may refer to an underlying (e.g., physical) computing device that implements a virtualized computing device. The present disclosure utilizes the terms "physical host" or "virtualization host" to refer to hosts in the virtualization context, to avoid ambiguity. Accordingly, general reference to a "host" should be understood to refer to a network host, and not necessarily to a physical computing device or virtualization host. Nevertheless, it is recognized that a virtualization host may represent a network host, and vice versa.

To enable communications between networks 108A and 108B (or to other networks not shown in FIG. 1A, such as a wide area network (WAN) or global area network (GAN) like the Internet), each network 108A and 108B includes a network device 112 that acts as a gateway for the network. Accordingly, hosts 102A, 102B may send data (e.g., in the form of packets) to the device 112 of their network 108A and 108B, in order for that data to be routed to an appropriate destination. Illustratively, an administrator of a network 108A and 108B may configure the device 112 such that traffic executing the network is directed to the stateful network routing service 106 for processing by an appliance 110 external to the network 108A and 108B.

The network 108A and 108B may include various network appliances between the network locations that perform operations on data being passed between network locations. For example, network appliances may provide firewalling or filtering, logging, auditing, virus scanning, traffic analytics, or other functionality. Network appliances are often physically and serially inserted in a network to perform management or monitoring functions. Network appliances can also be provided within virtual network environments, with the appliance logically inserted into a communication path of the network. In either instance, a given network appliance is typically associated with a single network environment and forms part of that environment.

In order to receive traffic from the network host 102A and the network host 102B, a stateful network routing service 106 coupled to the infrastructure for the network 108A and 108B and interposed between the network host 102A and the network host 102B may include a plurality of network interfaces 114 to intercept (i.e., receive) traffic. Subject to configurable rules, any traffic exchanged on the network 108A and 108B between the network host 102A and the network host 102B can be intercepted by the stateful network routing service 106 via a client-facing network interface 114. In some embodiments, each distinct network 108A and 108B may correspond to a separate client-facing network interface 114. Further, traffic exchanged between the network appliances 110 and the stateful network routing service 106 can be intercepted by the stateful network routing service 106 via an appliance-facing network interface 114B. For example, the stateful network routing service may include a client-facing network interface 114A to intercept network traffic generated by the network hosts 102A, 102B and an appliance-facing network interface 114B to intercept network traffic generated by a network appliance 110. Based on the network interface that a given packet is received through, the stateful network routing service 106 may be capable of determining associated packet information. For example, the stateful network routing service 106 may be capable of determining whether the packet was sent by a client or by an appliance. Further, based on the network interface 114 that the traffic is received on, the stateful network routing service 106 may be capable of determining whether the traffic has been encapsulated. Such network interfaces 114 may enable the stateful network routing service 106 to receive and transmit traffic between the stateful network routing service 106 and the network appliances 110 and/or network hosts 102A, 102B.

To facilitate routing of traffic from networks 108A and 108B to appliances 110, the stateful network routing service 106 may maintain routing rules. For example, the routing service 106 may associate an incoming packet with a specific routing rule that states that traffic from the network host 102A to the network host 102B device should be routed from the routing service 106 to a network appliance 110. The routing rule may be used by the stateful network routing service 106 to determine a network appliance 110 that the packet should be transmitted to. The stateful network routing service 106 may receive a corresponding packet from the network appliance 110 and determine a source and a destination of the packet based at least in part on decapsulating the packet. For example, decapsulating the packet may include removing an outer header of the packet and the source and destination of the packet may correspond to an inner header of the packet. Further, the stateful network routing service 106 may validate the packet based on the routing rule. Therefore, the routing rule may be used by the stateful network routing service to transmit traffic from the network host 102A to the network host 102B through the network appliance.

In order to route the packets 104, the stateful network routing service 106 may determine a network appliance to which to route the packets 104. As illustrated in this non-limiting example, the stateful network routing service 106 routes the data packets 104A and the data packets 104B through the same network appliance 110B. The data packets 104A and the data packets 104B may correspond to a network data connection that is a bidirectional data flow, such as through a single TCP or UDP connection. The stateful network routing service 106 may provide that a corresponding related and/or return data flow is routed through the same network appliance 110B as a corresponding forward data flow. Related data may include error messages, including Internet control message protocol (ICMP) messages. Such an approach to assignment may be required for the network appliance 110 to properly perform its processing functions, even if the other network appliances 110 can perform the same functions. As will be described, the stateful network routing service 106 may also maintain existing flow assignments to network appliances 110 after scaling up the network appliances 110 by adding previously unavailable network appliances to the network appliances 110. The stateful network routing service 106 may perform health-checks on the network appliances 110, and if necessary, reroute flows to different network appliances 110 to avoid interrupting the flows. In some embodiments, the data packets 104A and the data packets 104B may be routed through different network appliances 110. The network appliance 110B may be selected through a flow hashing approach designed to approximately equally distribute network traffic among the network appliances 110 that perform a replicated function. Other approaches to selection may be used, including time-based selection approaches or selection approaches that monitor throughput data rate, processor load, connection quantities, and/or other metrics pertaining to the network appliances 110 and attempt to assign flows based at least in part on one or more of these metrics in an equitable manner. Through these approaches, the stateful network routing service 106 may determine a network appliance 110 to route the packets 104.

In order to monitor traffic being transmitted to network appliances 110, the stateful network routing service 106 routes data on the network 108A and 108B to and from a plurality of network appliances 110A, 110B . . . 110N such that the stateful network routing service 106 controls the routing and forwarding of inbound and outbound traffic for the network appliances 110. In some embodiments, the stateful network routing service 106 may monitor traffic by including flow validation information with the packet 104 in order to ensure that a network appliance 110 does not inadvertently permit cross traffic between environments. Upon receipt of a packet from the network appliances, the stateful network routing service 106 may parse a packet 104 received from the network appliances to determine if the flow validation information matches flow validation information originally included with the packet 104. The stateful network routing service 106 may compare the flow validation information of the received packet 104 with corresponding flow validation information stored in a flow data store of the stateful network routing service. The flow validation information may be compared with the stored flow validation information based at least in part on the information from the packet 104 (e.g., the flow validation information, the flow information). Therefore, the stateful network routing service 106 may control the routing and forwarding of inbound and outbound traffic for the network appliances 110 based on the flow validation information.

The network appliances 110 may perform various functions, such as monitoring, firewalling, filtering, malware scanning, and so forth. In one example, the network appliances 110 may perform the same function and may be replicated as needed to achieve scaling based on traffic volume. In other examples, various network appliances 110 may perform different functions, and the stateful network routing service 106 may route network traffic through multiple network appliances 110 that perform different desired functions. In some implementations, multiple stateful network routing services 106 may be deployed serially or in a stacked configuration, with each stateful network routing service 106 routing traffic to and from different groupings of network appliances 110, where respective groupings perform different functions. The network appliances 110 may operate transparently in a "bump-in-the-wire" mode. Alternatively, the network appliances 110 may perform network address translation (NAT) if desired. The network appliances 110 may perform the various functions on each packet of traffic received from the stateful network routing service 106.

As a result of performing corresponding functions, the network appliances 110 may determine whether to forward or drop a packet. The network appliances may forward (e.g., allow) a packet in order to send the packet to its destination network host. The network appliances 110 may inspect the packet and allow the packet to proceed on to the destination network host without making changes to the content of the packet. In some embodiments, the network appliances 110 may not allow (e.g., drop) the packet in order to prevent the packet from being sent to the destination network host. For example, if the network appliances 110 are a firewall, the packet may be dropped based at least in part on a pre-defined policy and the packet may be discarded the network appliances 110. Further, in other embodiments, the network appliance may act as a secure sockets layer which may result in two separate flows of network traffic (e.g., a first flow between the source network host and the appliance on the front end and a second flow between the appliance and the destination network host on the back end.) For example, a first packet may be sent to the network appliance corresponding to the first flow and a second packet may be sent from the network appliance corresponding to the second flow. As a result, the network appliances 110 may determine a transmission decision for packets.

While the routing service 106 is shown in FIG. 1A as distinct from the appliances 110, in some embodiments the routing service 106 and appliances 110 may co-exist within a network (e.g., a logical network environment). In the example of FIG. 1A, either or both the networks 108A and 108B may represent serviced environments.

Figure 1B:
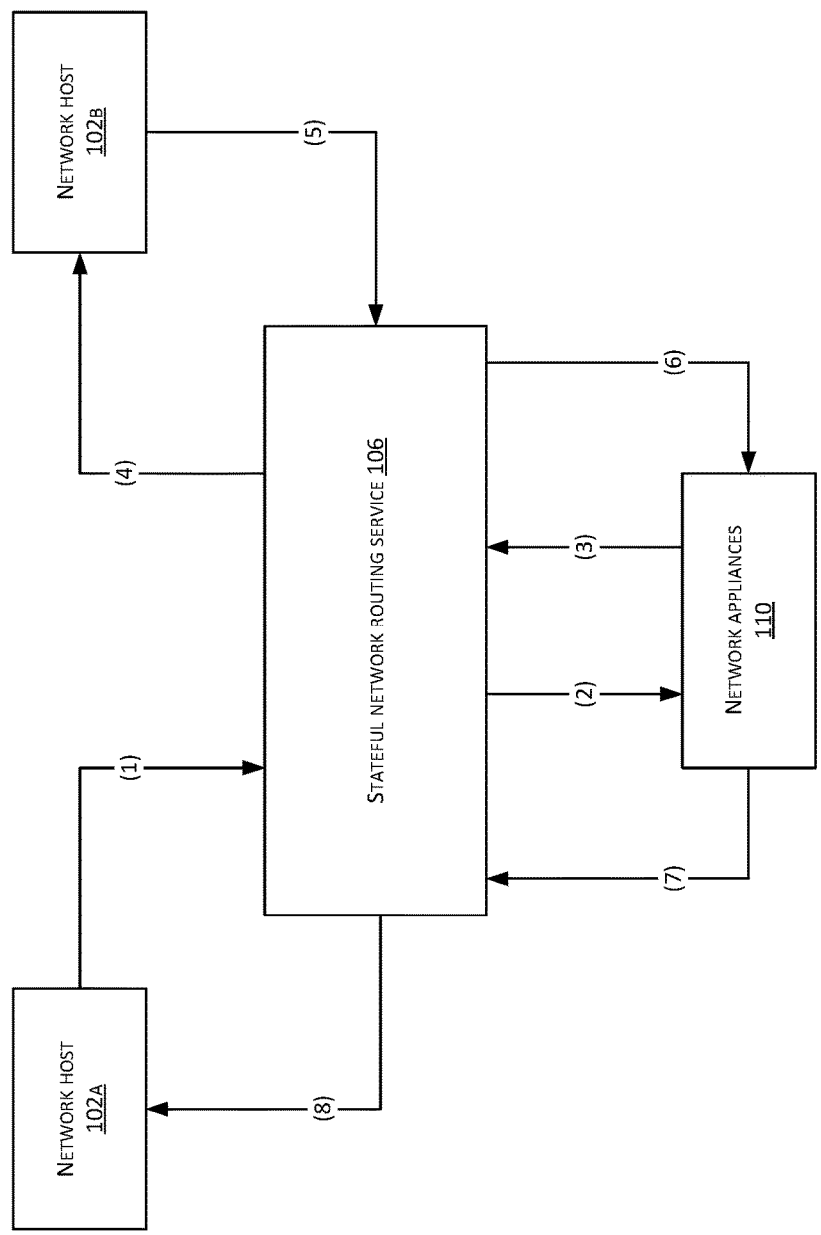
FIG. 1B depicts a schematic diagram of a network including network hosts in communication with a stateful network routing service in accordance with aspects of the present disclosure.

With reference to FIG. 1B, illustrative interactions for implementing a portion of the network management service will be described. Specifically, the illustrative interactions of FIG. 1B depict how a flow of network traffic between a network host 102A and another network host 102B can be transmitted. Further, the illustrative interactions of FIG. 1B depict a stateful network routing service 106 that intercepts packets of the flow of network traffic and redirects the packets to network appliances 110 for one or more operations.

The interactions of FIG. 1B begin at (1), the network host 102A generates a packet corresponding to a flow of network traffic between the network host 102A and the network host 102B in order to send data between the network hosts. The network host 102A may periodically generate packets corresponding to the flow of network traffic. Further, the network host 102A may generate multiple packets to be delivered to a plurality of other network hosts. A packet generated by the network host 102A can include an Internet Protocol (IP) address layer, as will be described later, detailing the source and destination of the packet. In the example of FIG. 1B, the packet may include a source IP address corresponding to the network host 102A and a destination IP address corresponding to the network host 102B. The source and destination of the packet may correspond to a first routing rule. In the example of FIG. 1B, the first routing rule corresponds to (network host 102A, network host 102B) and (stateful network routing service 106, network appliance 110A). The network host 102A may generate the packet according to the routing rule to send the packet to a corresponding network destination At (2), the packet may be intercepted by the stateful network routing service 106 in order to provide the packet to a network appliance prior to transmitting the packet to the network host 102B according to a routing rule. The stateful network routing service 106 may intercept all packets corresponding to the flow of network traffic between network host 102A and network host 102B. In some embodiments, the stateful network routing service 106 may intercept a portion of the packets corresponding to the flow of network traffic. In some embodiments, the stateful network routing service 106 may intercept packets corresponding to multiple flows of network traffic. The stateful network routing service 106 may intercept the packets based at least in part on the source and destination of the packet. The stateful network routing service 106 may include two or more network interfaces for intercepting packets of the network traffic. The stateful network routing service 106 may include a first network interface for intercepting packets of network traffic from network hosts and/or clients (e.g., a client-facing network interface) and a second network interface for intercepting packets of network traffic from network appliances (e.g., an appliance-facing network interface). The stateful network routing service 106 may intercept the packet via the client-facing network interface for transmission to the network appliance.

Based at least in part on intercepting the packet via a client-facing network interface, the stateful network routing service 106 may parse the packet in order to determine a routing rule associated with the packet. The routing rule may include an updated source and destination of the packet corresponding to which network appliance should receive the packet from the stateful network routing service. The stateful network routing service 106 may encapsulate the packet (or otherwise enrich the packet) in a header to generate an encapsulated packet that includes a new source and destination, the new source and destination corresponding to the routing rule. The original source and destination of the packet may further be encapsulated within the encapsulated packet. The stateful network routing service 106 may transmit the packet to a network appliance based on the routing rule.

At [3], the network appliance 110A may receive the encapsulated packet and perform management or monitoring functions in order to assist in the transmission of the flow of network traffic. The network appliance 110A may perform management or monitoring functions and transmit the encapsulated packet to the stateful network routing service 106. The network appliance 110A may parse the encapsulated packet in order to determine a source and destination of the encapsulated packet. In the example of FIG. 1B, the encapsulated packet may include a source: (stateful network routing service 106) and a destination: (network appliance 110A). The network appliance 110A may obtain the source and destination and reverse the source and destination designations. For example, where the source and destination of the encapsulated packet is (stateful network routing service 106) and (network appliance 110A) respectively, the network appliance 110 may generate an updated source (network appliance 110A) and an updated destination: (stateful network routing service 106). Subsequent to performing functions on the encapsulated packet, the updated encapsulated packet may then be transmitted to the stateful network routing service 106, according to the updated source and updated destination of the updated encapsulated packet.

At [4], the stateful network routing service 106 may receive the updated encapsulated packet from the network appliance 110A in order to route the packet to a destination network host. The stateful network routing service 106 may receive the updated encapsulated packet via an appliance-facing network interface based at least in part on receiving the updated encapsulated packet from a network appliance. By receiving the first updated encapsulated packet via an appliance-facing network interface, the stateful network routing service 106 may determine that the packet is an encapsulated packet and should be transmitted to a destination network host. Based at least in part on receiving the updated encapsulated packet via an appliance-facing network interface, the stateful network routing service 106 may remove the encapsulation header from the updated encapsulated packet. Removing the encapsulation header from the updated encapsulated packet may include removing the updated source and destination of the packet. By removing the updated source and destination of the packet, the original source and destination of the packet may become the source and destination of the packet. In the example of FIG. 1B, the source and destination of the packet may become (network host 102A) and (network host 102B) respectively. Further, based at least in part on receiving the updated encapsulated packet via the appliance-facing network interface, the stateful network routing service 106 may validate the updated source and destination of the first updated encapsulated packet. Validating the updated source and destination may include comparing the source and destination with the routing rule. The stateful network routing service 106 may transmit the packet, based at least in part on the original source and destination of the packet, to the network host 102B. At [5], the network host 102B may receive packets corresponding to the flow of network traffic between the network host 102A and the network host 102B. The network host 102B may receive a packet and determine that a response to the packet is needed/required to be transmitted to network host 102A, the response corresponding to a second packet. The network host 102B may generate a second packet corresponding to a flow of network traffic between the network host 102A and the network host 102B in order to send data between the network hosts. In the example of FIG. 1B, the second packet may include a source IP address corresponding to the network host 102B and a destination IP address corresponding to the network host 102A. The source and destination of the second packet may correspond to a second routing rule. In the example of FIG. 1B, the second routing rule corresponds to (network host 102B, network host 102A) and (stateful network routing service 106, network appliance 110A). Based at least in part on the second routing rule, the network host 102B may transmit the second packet to the network host 102A.

At [6], the stateful network routing service 106 may intercept the second packet of a flow of network traffic between the network host 102B and the network host 102A in order to provide the second packet to a network appliance prior to transmitting the second packet to the network host 102A. The stateful network routing service 106 may intercept all packets corresponding to the flow of network traffic between network host 102B and network host 102A. The stateful network routing service 106 may intercept the second packet via the client-facing network interface based at least in part on the second packet being transmitted by the network host 102B. Based at least in part on intercepting the second packet via the client-facing network interface, the stateful network routing service 106 may parse the second packet in order to determine a second routing rule associated with the second packet. The stateful network routing service 106 may encapsulate the second packet in a header to generate a second encapsulated packet that includes a new source and destination, the new source and destination corresponding to the second value of the second routing rule. The original source and destination of the second packet may further be included within the second encapsulated packet. The stateful network routing service 106 may transmit the second packet to a network appliance based on the second routing rule. At [7], the network appliance 110A may receive the second encapsulated packet and perform management or monitoring functions in order to assist in the transmission of the second flow of network traffic. The network appliance 110A may parse the second encapsulated packet in order to determine a source and destination of the second encapsulated packet. In the example of FIG. 1B, the second encapsulated packet may include a source: (stateful network routing service 106) and a destination: (network appliance 110A). The network appliance 110A may obtain the second encapsulated packet reverse the source and destination designations based at least in part on receiving the second encapsulated packet. The source and destination of the second encapsulated packet may be updated according to the updated source and updated destination. The second updated encapsulated packet may then be transmitted to the stateful network routing service 106, according to the updated source and updated destination of the second encapsulated packet.

At [8], the stateful network routing service 106 may receive the second updated encapsulated packet from the network appliance 110A in order to route a second packet to a destination network host. The stateful network routing service 106 may receive the second updated encapsulated packet via an appliance-facing network interface. By receiving the updated encapsulated packet via an appliance-facing network interface, the stateful network routing service 106 may determine that the packet is an encapsulated packet and should be transmitted to a destination network host. Based at least in part on receiving the second updated encapsulated packet via an appliance-facing network interface, the stateful network routing service 106 may decapsulate the second update encapsulated packet by removing the encapsulation header from the second updated encapsulated packet to generate a second packet. By removing the updated source and destination of the second updated encapsulated packet, the original source and destination of the second packet may become the source and destination of the second packet. In the example of FIG. 1B, the source and destination of the second packet may become (network host 102B) and (network host 102A) respectively. Further, based at least in part on receiving the second updated encapsulated packet via the appliance-facing network interface, the stateful network routing service 106 may validate the source and destination of the second updated encapsulated packet based on the second routing rule. The second packet may then be transmitted by the stateful network routing service 106 to the network host 102A.

Figure 2:
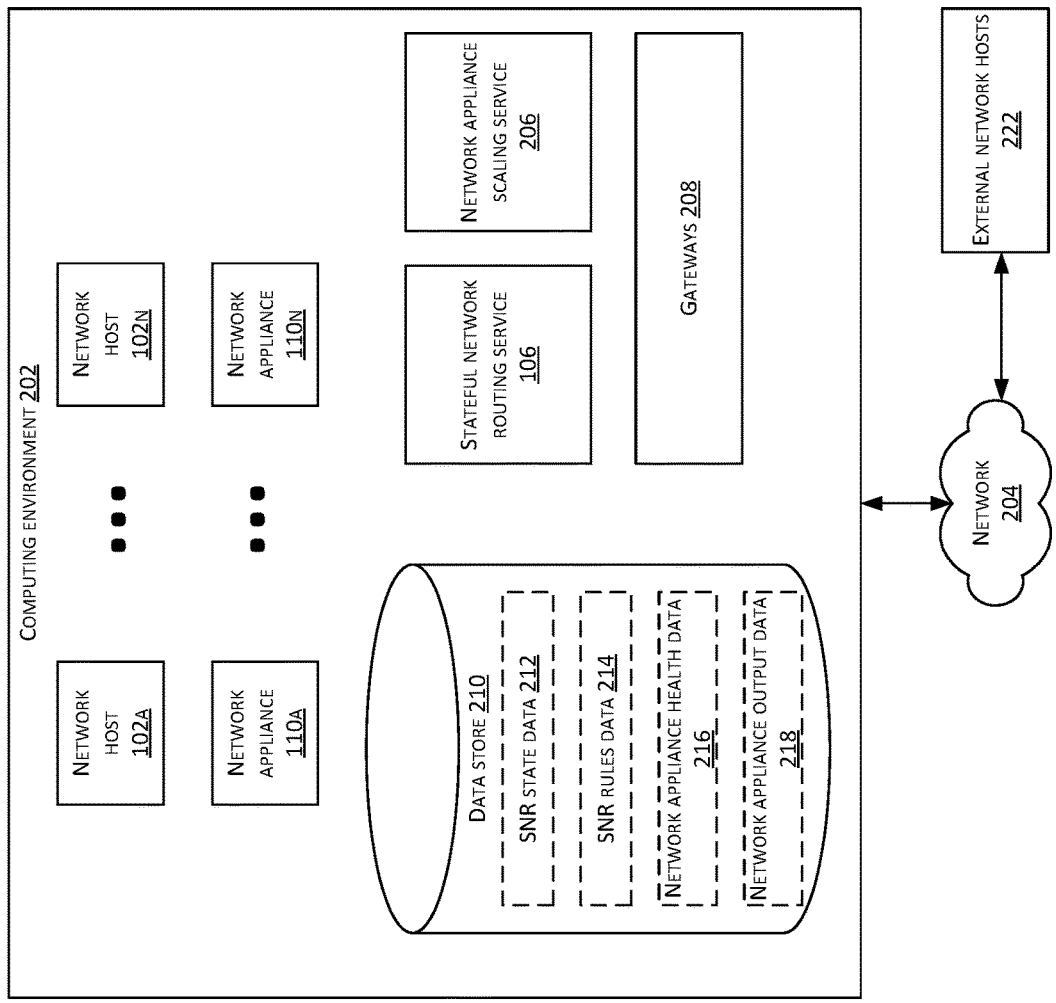
FIG. 2 depicts a schematic diagram of networked environments according to some embodiments.

FIG. 2 illustrates an example environment 200 according to various embodiments. The networked environment 200 includes a computing environment 202 and external network hosts 222, which are in data communication with each other via a network 204. The network 204 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 202 may comprise, for example, a server computer or any other system providing computing capability. Alternatively, the computing environment 202 may employ a plurality of computing devices that may be arranged, for example, in one or more server banks or computer banks or other arrangements. Such computing devices may be located in a single installation or may be distributed among many different geographical locations. For example, the computing environment 202 may include a plurality of computing devices that together may comprise a hosted computing resource, a grid computing resource, and/or any other distributed computing arrangement. In some cases, the computing environment 202 may correspond to an elastic computing resource where the allotted capacity of processing, network, storage, or other computing-related resources may vary over time. In one embodiment, the computing environment 202 corresponds to a virtual private network operated under a utility computing model on behalf of a customer with virtualized infrastructure.

The computing environment 202 may include various types of networking infrastructure to provide network connectivity to the respective components within the computing environment 202. Such networking infrastructure may include routers, switches, bridges, hubs, and a variety of physical links such as optical, twisted pair, coaxial, wireless, and so on. The networking infrastructure may employ data link layer protocols such as Ethernet, 802.11, token ring, etc., where respective components are assigned media access control (MAC) addresses. Internet protocol (IP) or other protocols may be used as a network layer protocol. The networking traffic within the computing environment 202 may be encrypted using internet protocol security (IPsec) or another approach and encapsulated using generic routing encapsulation (GRE) or another approach.

Various applications and/or other functionality may be executed in the computing environment 202 according to various embodiments. Also, various data is stored in a data store 210 that is accessible to the computing environment 202. The data store 210 may be representative of a plurality of data stores 210 as can be appreciated. The data stored in the data store 210, for example, is associated with the operation of the various applications and/or functional entities described below. In some embodiments, the data store 210 may be one or more flow data stores.

The components executed in the computing environment 202, for example, include a plurality of network hosts 102, a plurality of network appliances 110, one or more stateful network routing services 106, one or more network appliance scaling services 206, one or more gateways 208, and other applications, services, processes, systems, engines, or functionality not discussed in detail herein.

The network hosts 102 may correspond to network services such as web services, mail services, database services, media transcoding services, and/or other types of network services. Individual network hosts 102 may correspond to respective physical computing devices or virtualized machine instances executed on physical computing devices. In some cases, multiple network hosts 102 may be executed on a single virtualized machine instance having multiple virtual network gateways. Also, multiple virtualized machine instances may be executed on a single physical computing device, where the virtualized machine instances have separate virtual network gateways.

The network appliances 110 may correspond to specialized physical computing devices or customized virtualized machine instances executed on physical computing devices that perform specific processing functions on network data. Each network appliance 110 may have a respective inbound network gateway and a respective outbound network gateway, such that data packets 104 (FIG. 1) are received via the inbound network gateway, processed, and then forwarded via the outbound network gateway. The processed data packets 104 may simply be repeated by the network appliance 110, or they may be modified in some way or even dropped and not forwarded via the outbound network gateway. Because the network appliances 110 are surrounded by the stateful network routing service 106 that may guarantee that bidirectional and related flows are routed to the same network appliance 110, individual network appliances 110 do not need to obtain state information such as connection or flow state information from other network appliances 110.

The stateful network routing service 106 is executed to route network traffic to and from a target, such as a bank of network appliances 110. What network traffic is routed through the stateful network routing service 106 may be configured based on routing table rules. For example, all network traffic within the computing environment 202 may be routed through the stateful network routing service 106. Alternatively, selected portions of network traffic may be routed through the stateful network routing service 106 based on source address, destination address, source port, destination port, protocol, application layer data, and/or other criteria. The stateful network routing service 106 may transparently intercept traffic between network hosts 102 in the computing environment 202 or traffic between network hosts 102 and external network hosts 222 via a gateway 208. The stateful network routing service 106 may transparently intercept all traffic within a subnet or within multiple subnets.

In one embodiment, in order to assign network data flows to particular network appliances 110, the stateful network routing service 106 may perform flow-based hashing. As a non-limiting example, the stateful network routing service 106 may examine the identifying header information for the data packets 104 within a flow, potentially including source network address, destination network address, source port, destination port, and protocol type, and generate a hash value using a one-way hash function. The stateful network routing service 106 may then map the resulting hash value to a particular network appliance 110 so that the hash values are approximately evenly distributed among the network appliances 110 that perform a desired function. In generating the hash value, the stateful network routing service 106 may consider the source and destination data equivalently (e.g., by concatenating a lower value port to a higher value port rather than concatenating a source port to a destination port) so that the resulting hash value is the same when the source and destination are reversed. This achieves the desired result of assigning corresponding return flows to the same network appliance 110 as the forward flows.

In intercepting the traffic, the stateful network routing service 106 may maintain the same source and destination (e.g., source and destination network addresses and ports), and the stateful network routing service 106 may not show up as a network hop on a traceroute by not decrementing the time-to-live (TTL) field. In some cases, the stateful network routing service 106 may bridge data link layer traffic, thereby updating source and/or destination MAC addresses. In other cases, the MAC addresses are not modified. Even if the stateful network routing service 106 transparently intercepts the traffic, the network appliance 110 may be visible by modifying the data packets 104 or by performing NAT or port address translation (PAT).

The stateful network routing service 106 may periodically, or in response to an event, perform health-checks upon the network appliances 110. In this regard, the stateful network routing service 106 may communicate with the network appliances 110 via simple network management protocol (SNMP) or another approach to query the state of the network appliances 110. Upon detection of a failure of a network appliance 110, the stateful network routing service 106 may reroute network traffic to a different network appliance 110 to avoid dropping a connection.

The network appliance scaling service 206 is executed to scale the quantity of the network appliances 110 up or down as needed to meet network traffic demands in the computing environment 202. To this end, the network appliance scaling service 206 may receive network utilization metrics from within the computing environment 202 and utilization information from the network appliances 110 to determine whether one or more network appliances 110 are unnecessary or if additional network appliances 110 should be deployed.

In scaling down, the network appliance scaling service 206 may terminate machine instances allocated to one or more network appliances 110 and/or reallocate network appliances 110 to other computing environments 202. In scaling up, the network appliance scaling service 206 may instantiate or launch new machine instances for new network appliances 110 or reallocate existing network appliances 110 to the computing environment 202. The scaling may be performed in response to user requests or automatically based upon the received metrics in combination with scaling rules and metric histories.

The gateways 208 are operable to route inbound traffic from the network 204 to respective entities within the computing environment 202 or outbound traffic from within the computing environment 202 to the network 204. The gateways 208 may perform NAT, for example, by transforming private network addresses to public network addresses. The gateways 208 may perform encryption and decryption as well as encapsulation and de-encapsulation functions.

The data stored in the data store 210 includes, for example, stateful network routing service state data 212, stateful network routing service rules data 214, network appliance health data 216, network appliance output data 218, and potentially other data. The stateful network routing service state data 212 tracks state information for network flows intercepted by the stateful network routing service 106. For example, the stateful network routing service state data 212 may record assignments of flows to particular network appliances 110. The stateful network routing service rules data 214 include rules that configure which network traffic within the computing environment 202 is routed to the stateful network routing service 106 for distribution to particular types of network appliances 110.

The network appliance health data 216 may include information about network appliance 110 health received by the stateful network routing service 106 as part of health checks. The network appliance output data 218 may include data generated by network appliances 110. Such data may include analytics data, logging data, malware detection data, firewall operations data, and/or other data.

FIG. 3 illustrates an example environment 300 illustrating an example configuration involving two computing environments 202A and 202B. The computing environments 202A and 202B may correspond to separate private networks or virtual private networks, which may be operated on behalf of different entities or users. The computing environment 202A includes network hosts 102 and gateways 208, along with a stateful network routing service 106. In some embodiments, the stateful network routing service 106 may be executed in the computing environment 202B. The stateful network routing service 106 may provide a virtual network gateway into the computing environment 202A in addition to a virtual network gateway into the computing environment 202B which permits it to intercept network traffic within the computing environment 202A and route it to network appliances 110 in the computing environment 202B. As an alternative, the stateful network routing service 106 may be implemented in the computing environment 202A, while the network appliances 110 implemented in the computing environment 202B may be given virtual network gateways in the computing environment 202A. The network appliance scaling service 206 may also be implemented in the computing environment 202B. The stateful network routing service 106 and/or the network appliances 110 may be operated as a service by a third party that operates the computing environment 202B. Access may be provided under a utility computing model, whereby the operator of the computing environment 202A pays for metered use of the network appliances 110 and/or the stateful network routing service 106. In another example, one or more network hosts 102 are also in a different computing environment 202 or network, and these network hosts 102 may be given virtual network gateways in the computing environment 202A and/or 202B. Further, the stateful network routing service 106 may be given a virtual network gateway into this different computing environment 202, which permits it to intercept network traffic within the different computing.

Figure 4A:
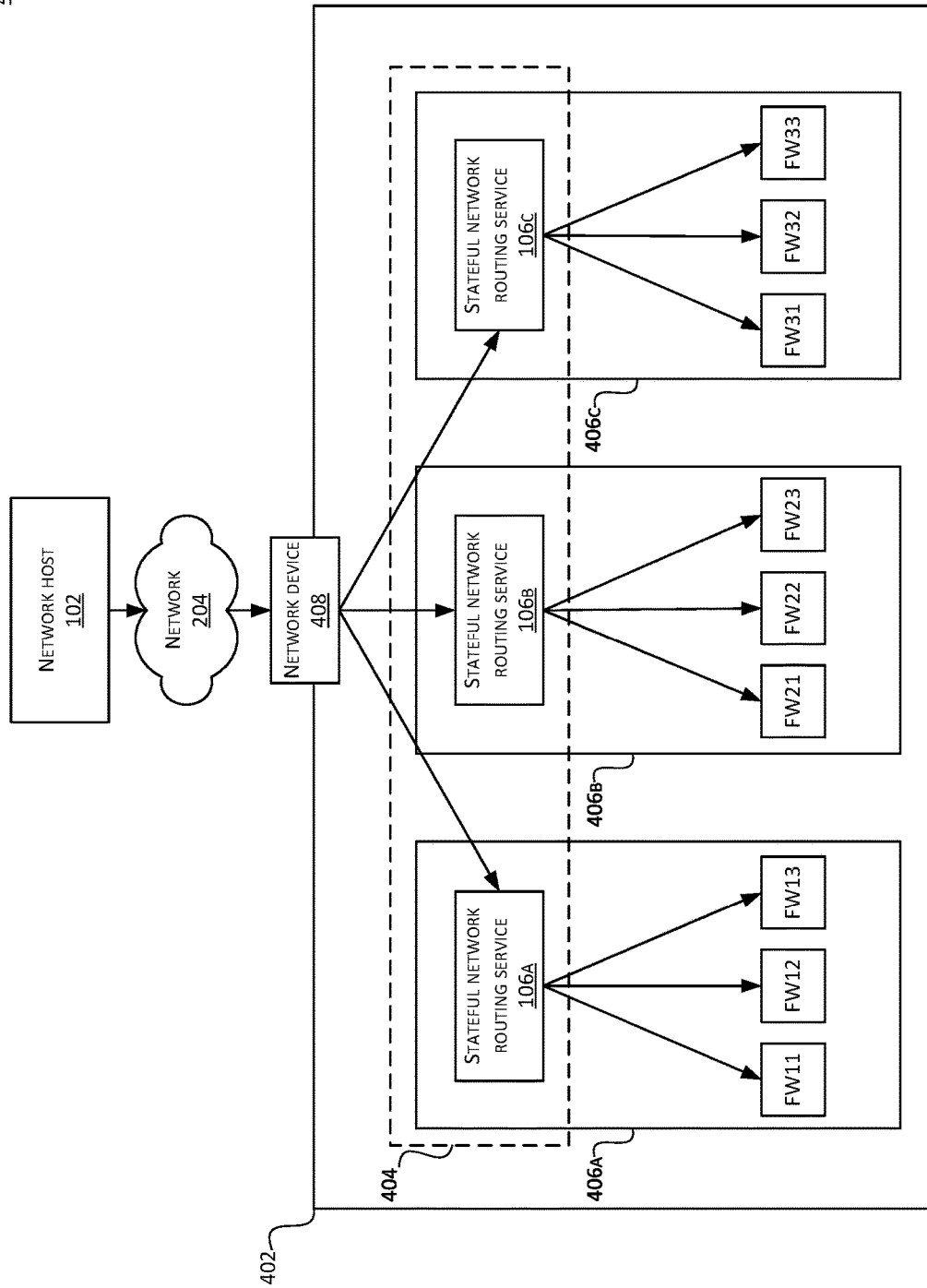
FIG. 4A depicts a schematic diagram of a pool of stateful network routing services and network appliances according to some embodiments.

FIG. 4A illustrates an example environment 400A according to various embodiments in which a virtual private environment includes a pool 404 of stateful network routing services 106A, 106B, and 106C configured to obtain packets generated by a network host 102 and to pass those packets to an appliance for processing. The example environment 400A enables a regional view of a pool 404 of stateful network routing services 106A, 106B, and 106C distributed across and contained within multiple availability zones. The pool 404 of stateful network routing services 106A, 106B, and 106C ensures that packets generated by the network host 102 are transmitted to a healthy and/or available stateful network routing service 106A, 106B, and 106C associated with a healthy and/or available appliance. The networked environment 400A includes a network host 102 (which illustratively exists within a serviced environment) and a virtual private environment 402 including a fleet of appliances, which are in data communication with each other via a network 204. A network device 112 may receive network traffic generated by the network host 102 and transmit it to the virtual private environment 402. Illustratively in FIG. 4A, the network device 112 may act as a network gateway for transmitting the network traffic from the network host 102 to the virtual private environment 402. In some embodiments, the network device 112 may be located in the virtualized private environment 402 but separate from the pool 404 of stateful network routing services 106A, 106B, and 106C. In other embodiments, the network device 112 may be located in the network 204 or otherwise separate from the virtual private environment 402. The virtual private environment 402 may include a pool 404 of stateful network routing services 106A, 106B, and 106C. The network device 112 may select a stateful network routing service 106A, 106B, and 106C of the pool 404 of stateful network routing services 106A, 106B, and 106C. As discussed above, each stateful network routing service 106A, 106B, and 106C of the pool 404 may include both a client-facing interface, on which traffic from the host 102 is received, and one or more appliance-facing interfaces, on which traffic from a set of appliances (designated FW11-FW33) is received. Each stateful network routing service 106A, 106B, and 106C may further act as a network gateway for transmitting traffic to the network appliances. For example, a stateful network routing service 106A, 106B, and 106C may act as a gateway to transmit traffic from the network host 102 to the network appliances. The virtual private environment 402 may be logically distributed among a plurality of availability zones 406A, 406B, and 406C, each of which represents a logically isolated network environment. Each of the plurality of availability zones 406A, 406B, and 406C may further correspond to a stateful network routing service (e.g., stateful network routing service 106A) and an associated plurality of network appliances (e.g., FW11, FW12, and FW13), which in the illustration of FIG. 4A provide a firewall service to the host 102.

The network host 102 may generate a plurality of packets in order to communicate data to a network destination. The plurality of packets may be delivered intermittently over a period of time to the network 204 for transmission to a destination network host. Prior to the destination network host receiving the plurality of packets, the packets may be intercepted by a network device 112 within the network 204. The network device 112 may route the plurality of packets to the pool 404 of stateful network routing services 106A, 106B, and 106C within a virtual private environment 402.

The virtual private environment 402 may correspond to a configurable pool of network resources that may be used as a client platform to perform one or more operations on the plurality of packets. The virtual private environment 402 may be a grouping of scalable resources for performing the operations. For example, the virtual private environment 402 may include scalable or otherwise configurable network resources (e.g., computing environments, network appliances, network gateways, etc.). The virtual private environment 402 may modify the number of network resources available to a client. For example, the virtual private environment 402 may provide a greater or lesser number of network resources available to a client based on the client's requirements, needs, and/or purchased resources. Further, the virtual private environment 402 may provide a number of network resources across a plurality of availability zones, each of which represents an isolated set of physical devices hosting such a zone. For example, the virtual private environment 402 may include a number of network resources in a first availability zone and a number of network resources in a second availability zone. The virtual private environment 402 may further isolate network traffic within the environment 402 from traffic external to the environment 402. For example, the virtual private environment 402 may be configured for a specific client and/or user and include a distinct set of IP addresses. The distinct set of IP addresses may be associated with a plurality of network appliances, network gateways, etc., operating within the environment 402.

The virtual private environment 402 is further shown as divided into a number of subnets and/or zones 406A, 406B, 406C (across the virtual private environment 402, zones 406A, 406B, and 406C), which may also be referred to as availability zones or availability regions. Each zone 406 illustratively represents a computing system that is isolated from the systems of other zones 406 in a manner that reduces a likelihood that wide-scale events such as a natural or man-made disaster, impact operation of all (or any two) zones 406 in a virtual private environment 402. For example, the computing resources of each zone 406 may be physically isolated by being spread throughout the virtual private network environment 402 at distances selected to reduce a likelihood of a wide-scale event affecting performance of all (or any two) zones 406. Further, the computing resources of each zone 406 may be associated with independent electric power, and thus be electrically isolated from resources of other zones 406 (though the resources may still communicate with one another via a network, which may involve transmission of electrical signals for communication rather than power), independent cooling systems, independent intra-zone networking resources, etc. In some instances, zones 406 may be further isolated by limiting operation of computing resources between zones 406. For example, virtual machine instances in a zone 406 may be limited to using storage resources, processing resources, and communication links in that zone 406. Restricting inter-zone cloud or network-based computing operations may limit the "blast radius" of any failure within a single zone 406, decreasing the chances that such a failure inhibits operation of other zones 406. Illustratively, services provided by the network appliances may generally be replicated within zones, such that a client can (if they so choose) utilize the network appliances entirely (or almost entirely) by interaction with a single zone 406.

Each subnet and/or availability zone 406 may further include a stateful network routing service (e.g., stateful network routing service 106A), from the pool 404 of stateful network routing services 106A, 106B, and 106C, and a plurality of scalable network appliances (e.g., FW11, FW12, and FW13) in order to perform monitoring and/or management functions on the packets. Each availability zone 406 may correspond to a unique stateful network routing service and a unique set of network appliances. For example, availability zone 406A corresponds to stateful network routing service 106A and network appliances FW11, FW 12, and FW13, availability zone 406B corresponds to stateful network routing service 106B and network appliances FW21, FW22, and FW23, and availability zone 406C corresponds to stateful network routing service 106C and network appliances FW31, FW32, and FW33. Each stateful network routing service may select a network appliance to route a given packet. Each network appliance may perform the same one or more operations on a packet received from the network host 102. The plurality of scalable network appliances may correspond to a resilient managed service for a client associated with a network host 102. In some embodiments, the network appliances may correspond to third party network appliances. The network appliances may be scaled according to desired performance (e.g., throughput, number of flows, flows per second, etc.) and can be scaled elastically. For example, the quantity of network appliances can be changed as network traffic volume changes and as the network traffic volume increases or decreases, network appliances may be added to the quantity of network appliances or removed from the quantity of network appliances. Network traffic may further be automatically rerouted to a healthy network appliance in the event that a network appliance is unhealthy and/or otherwise unavailable. Further, network traffic to a now unavailable network appliance may gracefully failover into a currently available network appliance.

To ensure that the network traffic is sent to an active and healthy stateful network routing service, the network 204 can include the network device 408 that receives the traffic and distributes the traffic to a specific zone 406 (and a specific stateful network routing service 106A, 106B, and 106C associated with that zone) based on the availability of the stateful network routing services, and/or the flow of network traffic. For example, network traffic between the host 102 and a first network destination may be distributed to a first zone 406A and network traffic between the host 102 and a second network destination may be distributed to a second zone 406B. The network device 408 may be a routing device with multiple interfaces (logical, virtual, or physical interfaces) where each interface corresponds to a given stateful network routing service. For example, the multiple interfaces may correspond to multiple Ethernet cables associated with the network device 408. Data may be passed from the network device 408 to a given stateful network routing service via a corresponding interface. For example, the network device 408 may pass data to stateful network routing service 406A via a first interface, stateful network routing service 406B via a second interface, and stateful network routing service 406C via a third interface. In some embodiments, the network device 408 can be included within the virtual private environment 402. In some embodiments, the packet may be distributed to a zone 406 based on an availability zone of the network host 102. For example, if the network host 102 exists within zone 406A, the network device 408 may route a packet from the network host 102 to zone 406A, if the stateful network routing service 106A in zone 406A is healthy. Further, if the stateful network routing service 106A in zone 406A is not healthy, the network device 408 may route the packet to a different zone (e.g., zone 406B or zone 406C) without regard to the network host 102 existing within zone 406A. In other embodiments, a packet may be sent to a network gateway in any availability zone.

To facilitate routing of packets to a particular stateful network routing service 106A, 106B, and 106C, the network device 408 may maintain a routing table. The routing table may illustratively indicate a "next hop," or next network device, to which to route packets corresponding to specific network addresses. In accordance with embodiments of the present disclosure, the "next hop" associated with traffic flowing from a network host 102 may be a logical representation of the pool 404, rather than any individual network device. On receiving a packet, the network device 408 may consult the routing table to determine how to route the packet. For example, where the network device 408 represents a gateway of the host 102 handling all traffic stemming from the host 102, the device 408 may include a routing table that identifies the pool 404 as a next hop for traffic addressed to any destination (e.g., as a "default route" for the host 102. On processing traffic corresponding to this route, the device 408 can resolve the identifier of the pool into a particular stateful network routing service 106A, 106B, and 106C to which to route the packet. In selecting a stateful network routing service to which to route the packet, the network device 408 may select a given interface of the network device 408 through which to route the packet. For example, where the interfaces of the network device 408 correspond to Ethernet cables, the network device 408 may select an Ethernet cable to route the packet. In one embodiment, the device 408 may be configured to identify a source availability zone of the host 102, and to route the packets to a routing service 106A, 106B, and 106C within the same zone, if such routing service 106A, 106B, and 106C is healthy. In another embodiment, the device 408 may be configured to distribute traffic across zones 406, such as by hashing an attribute of the packet (used as a partition key) and selecting a routing service 106A, 106B, and 106C according to a result of that hashing (e.g., using a hash ring). The device 408 can further maintain information identifying a particular routing service 106A, 106B, and 106C to which prior flows of traffic have been routed, such that subsequent traffic of that flow is routed to the same routing service 106A, 106B, and 106C absent failure of that routing service 106A, 106B, and 106C. A packet of network traffic generated by the network host 102 may thus be intercepted by the network device 408 and distributed to a specific network routing service 106A, 106B, and 106C based at least in part on including the pool 404 of stateful network routing services 106A, 106B, and 106C as the next-hop in the route table.

While described above as a component of the serviced environment of the host 102, the network device 408 may be a component of other networks, such as an 'edge router' controlling traffic into the serviced environment (which edge router may exist outside of the environment) or a gateway of other serviced environments.

In some embodiments, the network device 408 may monitor the health of the network gateways, stateful network routing services, and/or network appliances by performing health-checks on the corresponding component to ensure that each component is capable of receiving, handling, transmitting, and/or performing operations on a packet. The network device 408 may further determine that a zonal outage has occurred where the zonal outage indicates that a network gateway, a stateful network routing service, and/or a network appliance is unavailable. In response to a determination that a stateful network routing service and/or zone is unavailable, the network device 408 may halt resolving an identifier of a pool into the failed stateful network routing service or zone based on determining that a stateful network routing service or zone is unhealthy or no longer available. For example, in the case of a zonal outage, the network device 408 may remove all stateful network routing services that are associated with the corresponding availability zone. Further, the network device 408 may add stateful network routing services that have become healthy based on a health-check of the network device 408. While health checks are described herein as conducted by the network device 408, they may additionally or alternatively be conducted by a distinct device, such as one or more dedicated health check devices (not shown in FIG. 4A). Illustratively, such health check devices may maintain a listing of routing services 106A, 106B, and 106C and/or zones 406 associated with an identifier of the pool 404, and their corresponding health. A number of different network devices 408 may then interact with the health check devices to obtain that listing, in order to facilitate resolution of the pool identifier into a specific stateful network routing service 106A, 106B, and 106C.

FIG. 4B illustrates a pictorial diagram depicting an example route table 400B for routing network traffic of serviced environments to a number of distinct fleets of network devices, each of which is associated with a distinct pool of stateful network routing services (e.g., distributed among multiple network environments, such as different availability zones). Specifically, FIG. 4B illustrates how each pool of stateful network routing services (and thus each fleet of appliances) can be represented in a routing table as a single entry, thereby reducing the size of the routing pool relative to routing based on individual routing services within a pool.

As shown in FIG. 4B, the routing table includes a set of destinations 410 and a set of next-hops 412, indicating that a packet addressed to a given destination (e.g., a set of IP addresses written in CIDR notation) should be routed to a network location indicated by the next hop. In the example of FIG. 4B, the routing table may be maintained at a network device of the environment 200, such as a gateway 208. The device 408 of FIG. 4B may illustratively represent an "edge router" of the environment 200, and as such be configured to route traffic entering the environment 200 from other environments, such as the Internet. Each destination within the routing table may be associated with a distinct serviced environment, while each next hop may be associated with a fleet of appliances providing a service to that environment. As such, the network destination "192.0.0.0/24" is associated with a next hop of a first stateful network routing service pool, the network destination "192.0.1.0/24" is associated with a next hop of a second stateful network routing service pool, etc. Due to the routing table, packets addressed to an IP address within the destination field will be routed to the next-hop, and accordingly, ingress traffic into the respective serviced environments will be processed by the appliances of the respective pools.

As noted above, when obtaining a packet associated with a destination of the routing table, the network device 408 may identify, from the routing table, the pool of stateful network routing services to which the packet should be forwarded. The network device 408 may then resolve an identifier of that pool into a specific stateful network routing service of the pool of stateful network routing services for the packet. For example, the network device may select an available and/or healthy stateful network routing service to forward the packet to. In one embodiment where the packet was obtained from an availability zone of the environment 200 (e.g., a distinct portion of the environment 200 that is isolated from other zones), the network device 408 may select a stateful network routing service within the same availability zone as a next hop for the packet. The network device 408 may additionally or alternatively select the stateful network routing service based on load balancing criteria, according to performance of the selected routing service, etc. Accordingly, rather than maintaining multiple entries within the table for each fleet of appliances (and corresponding set of stateful network routing services), the device 408 may maintain a single entry within the table, and dynamically resolve the entry into a specific stateful network routing service at a time of routing.

Figure 5:
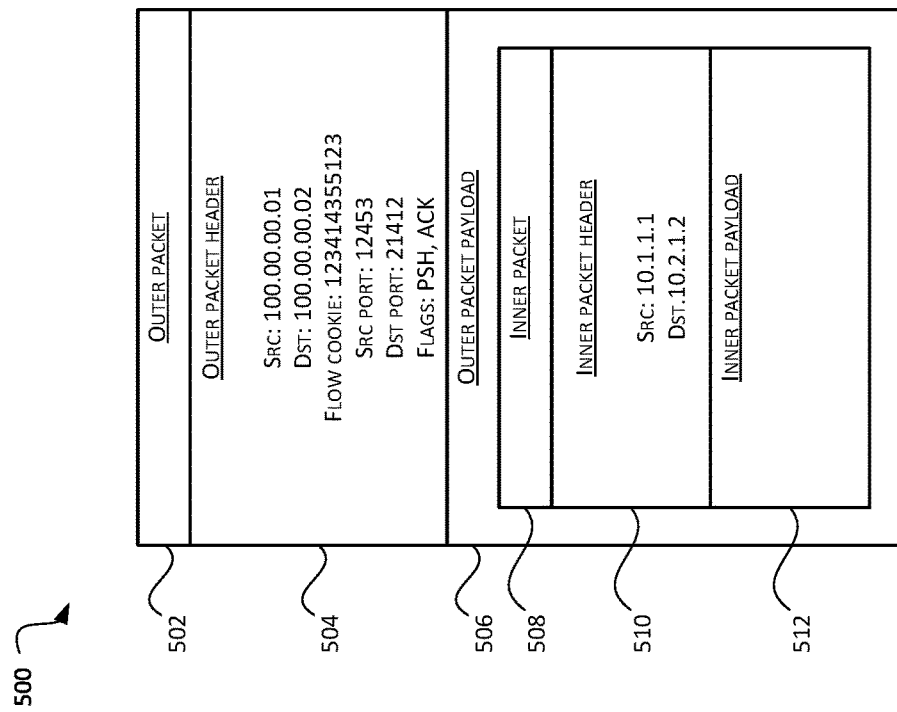
FIG. 5 is a pictorial diagram depicting an encapsulated packet in accordance with aspects of the present disclosure.

FIG. 5 illustrates a pictorial diagram depicting an example encapsulated packet 500 in accordance with aspects of the present disclosure. The encapsulated packet 500 may correspond to a packet of active network traffic between a source network host and a destination network host that has flow validation information included within the packet. To generate the encapsulated packet 500, a corresponding packet may be encapsulated and include, within the encapsulated packet, flow validation information. Further, the encapsulated packet 500 may also include other information such as an outer packet 502 and an inner packet 508, where the inner packet 508 corresponds to the packet before encapsulation. The outer packet 502 may include an outer packet header 504 and outer packet payload 506 and the inner packet 508 may include an inner packet header 510 and an inner packet payload 512. One or more layers or portions of the encapsulated packet 500 may correspond to control data and one or more layers of the encapsulated packet 500 may correspond to user data. In some embodiments, the encapsulated packet 500 may include additional fields or layers such as a user datagram protocol layer, an Ethernet layer, or a trivial file transfer protocol layer. One or more layers of the encapsulated packet 500 may correspond to layers added or information added via the encapsulation process.

The encapsulated packet 500 may include an outer packet 502 with an outer packet header 502. The outer packet header 502 may be added during the encapsulation of the packet. In some embodiments, the outer packet header 502 may be added to every packet that is encapsulated. In some embodiments, the outer packet header 502 may include one or more fields corresponding to an encapsulation protocol such as Generic Network Virtualization Encapsulation ("GENEVE"), Virtual Extensible LAN ("VXLAN"), Network Virtualization using Generic Routing Encapsulation ("NVGRE"), or Stateless Transport Tunneling ("STT"). The outer packet header 502 may include a source IP address and a destination IP address. The outer packet header 502 may provide a new destination IP address for the encapsulated packet 500. For example, the encapsulated packet 500 may correspond to network traffic between a first virtualized computing environment and a second virtualized computing environment and the original IP information may indicate that the first virtualized computing environment corresponds to a source IP address and the second virtualized computing environment corresponds to a destination IP address. During the encapsulation process, a first network device corresponding to the first virtualized computing environment may generate an updated source IP address corresponding to the first network device. Further, the first network device may generate an updated destination IP address corresponding to a second network device corresponding to the second virtualized computing environment. Therefore, the outer packet header 502 may be included within the encapsulated packet as one or more layers of the packet.

The outer packet header 502 may further include additional packet information. The additional packet information may correspond to TCP information associated with the base packet of the encapsulated packet 500. The outer packet header 502 may include one or more fields of TCP information. In the example of FIG. 5, the outer packet header 502 includes a source port, a destination port, and one or more flags. The outer packet header 502 may further include flow information included in the packet response.

Flow validation information may be added to the outer packet header 502 during the encapsulation of the packet by the stateful network routing service. In some embodiments, flow validation information may be added by other devices such as a network device in communication with a network host. In some embodiments, one or more packets may not include the flow validation information. In some embodiments, one or more packets may include the flow validation information in other layers of the packet such as the outer packet payload 506. The outer packet header 502 may include one or more fields of flow validation information. The one or more fields of flow validation information may include one or more of a flow validation flag, flow validation number, or other flow validation information. The flow validation flag may be a flag, identifier, tag, word string, or other indication that the encapsulated packet 500 has been encapsulated with flow validation information. The flow validation number may be a number, word string, tag, randomly generated string, or alphanumerical string corresponding to the flow of network traffic. The outer packet header 502 may therefore include flow validation information and an identifier that the flow validation information has been included.

The stateful network routing service may receive a packet and determine the packet has been encapsulated with flow validation information based on the flow validation flag. The flow validation flag may correspond to a logical high (e.g., a "1") or a logical low (e.g., a "0"). In some embodiments, the flow validation flag may correspond to a word string such as "encapsulated" indicating that the packet has been encapsulated with flow validation information. The flow validation number may be generated by a network device or by the stateful network routing service and may correspond to the specific flow of network traffic. For example, a flow validation number "0001" may be associated with the flow of network traffic between a first network host and a second network host. In some embodiments, a flow of network traffic may have multiple flow validation numbers assigned to the flow. The flow validation number may correspond to the timing of the generation of the encapsulated packet 500 (e.g., a first encapsulated packet may include a flow validation number "0001," a second encapsulated packet may include a flow validation number "0002," etc.). Therefore, by parsing the packet, the stateful network routing service may determine the flow validation information.

The outer packet 502 may also include an outer packet payload 506. The outer packet payload 506 may include an inner packet 508 that corresponds to an original packet of the encapsulated packet 500 prior to encapsulation. In some embodiments, the outer packet payload 506 may include additional information, The inner packet 508 may include an inner packet header 510. The inner packet header 510 may be added during the generation of the packet by the source virtualized computing environment. The inner packet header 510 may correspond to original IP information associated with the base packet of the encapsulated packet 500. For example, prior to encapsulation, the packet may be generated by a source virtualized computing environment to be delivered to a destination virtualized computing environment and the inner packet header 510 may include a source IP address corresponding to the source virtualized computing environment and a destination IP address corresponding to the destination virtualized computing environment. Therefore, the inner packet header 510 may be included within the encapsulated packet in order to determine an original IP source and/or destination of the packet.

The inner packet 508 of the encapsulated packet 500 may also include an inner packet payload 512. The inner packet payload 512 may be added during generation of the packet by the source virtualized computing environment. The inner packet payload 512 may correspond to user data to be sent from the source virtualized computing environment to the destination virtualized computing environment. For example, the inner packet payload 512 may correspond to user communications, user commands, or other user data. The inner packet payload 512 may be generated by one or more applications associated with the source virtualized computing environment. In some embodiments, the size of the inner packet payload 512 may be limited by various network protocols. For example, the size of the inner packet payload 512 may be limited to a discrete number of bytes. Therefore, the inner packet payload 512 may include a plurality of information to be delivered to the destination virtualized computing environment.

Figure 6:
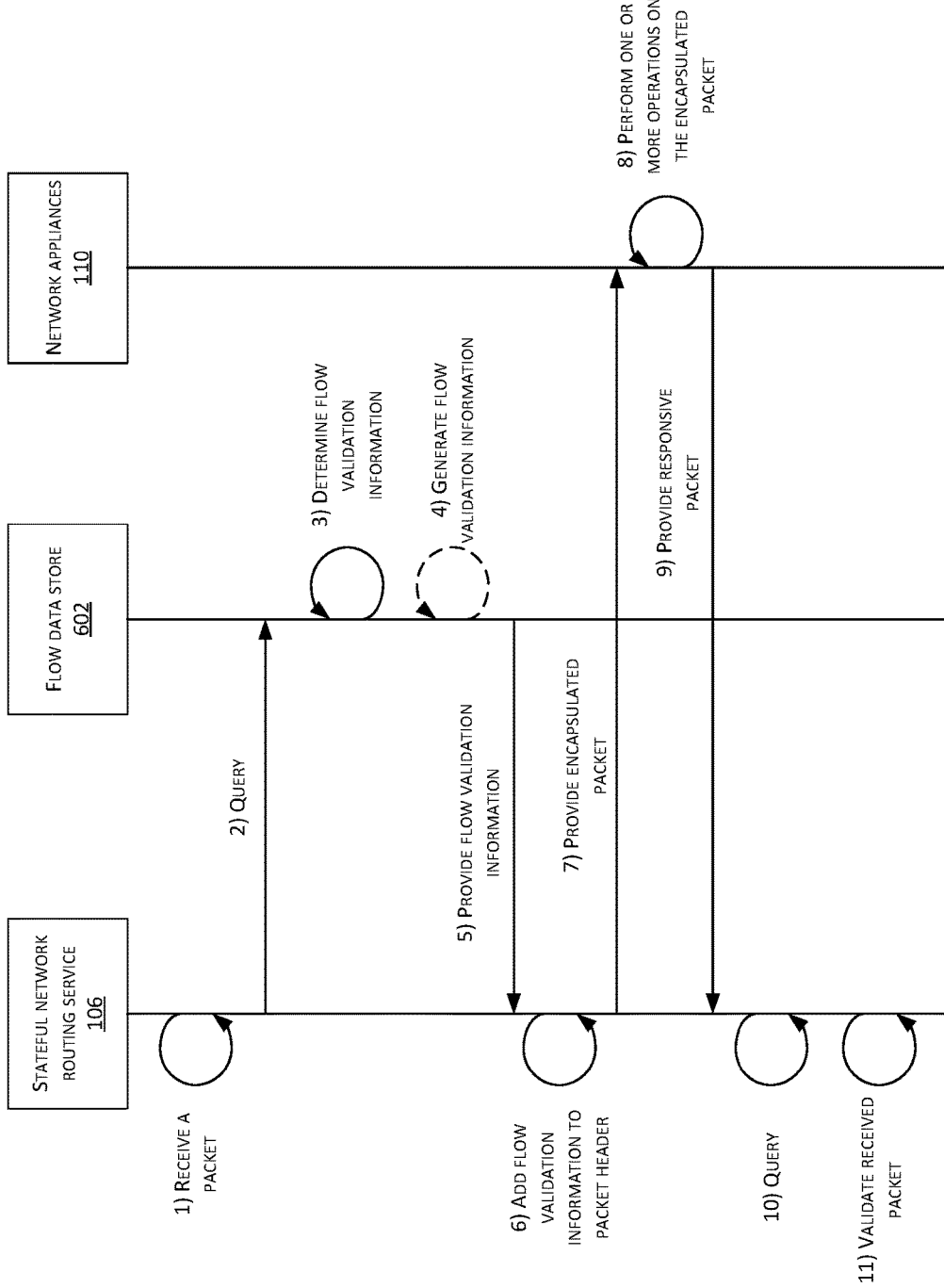
FIG. 6 depicts an example workflow for a stateful network routing service requesting enrichment data in response to receiving a packet.

With reference to FIG. 6, illustrative interactions for implementing a flow validation information protocol 600 at a stateful network routing service will now be described. Specifically, the illustrative interactions of FIG. 6 depict how the stateful network routing service 106 can obtain "flow validation information" (e.g., a unique identifier associated with the specific flow of network traffic) to prevent packets from being erroneously delivered to the wrong network destination. The network appliances may be associated with traffic of multiple tenants and therefore, it may be advantageous to ensure that the network appliances are sending the traffic to the correct tenant. For example, the network appliances may inadvertently corrupt the IP header of the packet and cause the packet to be transmitted to a wrong destination network host.

The interactions of FIG. 6 begin at (1), the stateful network routing service 106 may receive (e.g., intercept) a packet of data corresponding to a flow of network traffic in order to add flow validation information to a packet before transmitting the packet to a network appliance. The stateful network routing service 106 may intercept the packet based on one or more parameters dictating which packets should be intercepted. For example, the parameters may indicate that each packet should include flow validation information.

At (2), the stateful network routing service 106 may query a flow data store 602 in order to determine flow validation information associated with specific flow of network traffic. The flow data store 602 may be one or more of a primary flow data store, a secondary flow data store, a primary replica flow data store, or a secondary replica flow data store. In some embodiments, the flow data store 602 may include more or less data stores. The query may include flow information for the packet. For example, the stateful network routing service 106 may further provide an indication of the source and destination of the packet to the flow data store 602 in order to identify the specific flow of network traffic. The flow data store 602 may store a plurality of flow information and a plurality of flow validation information. Each unique set of flow information may be associated with unique flow validation information. For example, a flow of network traffic from a first source network host to a first destination network host may be associated with first flow validation information and a flow of network traffic from a second source network host to a second destination network host may be associated with second flow validation information. In some embodiments, a flow of network traffic from a first source network host to a first destination network host and a flow of network traffic from the first destination network host to the first source network host may be associated with the same flow validation information. In other embodiments, the flow of network traffic from a first source network host to a first destination network host may be associated with first flow validation information and a flow of network traffic from the first destination network host to the first source network host may be associated with second flow validation information.

At (3), the stateful network routing service 106 may determine flow validation information associated with a packet by querying the flow data store 602 based at least in part on the flow information associated with the packet in order to link the flow of network traffic with specific flow validation information. The flow data store 602 may be searched for the flow information associated with the packet. For example, if the packet is associated with a source network host and a destination network host, the flow data store 602 may be searched for the source network host and the destination network host. The stateful network routing service 106 may determine that the flow information is associated with flow validation information based at least in part on searching for the flow information. In some embodiments, the stateful network routing service 106 may determine that flow validation information has not been generated for the flow of network traffic corresponding to the flow information. Further, the flow data store 602 may generate flow validation information corresponding to the flow information and store the flow validation information and the flow information. The flow validation information may be a randomly generated number or string. In some embodiments, the flow validation information may be generated by mathematically incrementing or decrementing previously generated flow validation information. For example, previously generated flow validation information may be "0001" and the currently generated flow validation information may be "0002." In other embodiments, the flow validation information may have a mathematical relationship to previously generated flow validation information. In some instances, it may be advantageous that flow validation information is not directly derivable from information of traffic corresponding to the flow, to prevent devices other than the routing service 106 from generating flow validation information. For example, it may be desirable to prevent appliances 110 from independently determining flow validation information for a given flow (other than by reading such information from packets provided by the routing service 106). In this manner, the routing service 106 can help to ensure that appliances 110 do not "spoof" validation information into packets of other flows. In some embodiments, the flow validation information may not be generated by the flow data store 602 and may be generated by any other component of the system.

At (4), the flow validation information may not have previously been generated by the flow data store 602 and, based on the query by the stateful network routing service 106, the flow data store 602 may determine that the flow validation information has not been generated. Upon determining that the flow validation information has not previously been generated, the flow data store 602 may generate flow validation information based on the flow information of the packet. In some embodiments, the flow data store 602 may determine that the flow validation information is not stored at the flow data store 602. Further, the flow data store 602 may query a secondary flow data store (not shown in FIG. 6) to determine if the flow validation information is stored at the secondary flow data store 602. In some embodiments, the secondary flow data store may store the flow validation information and may transmit the flow validation information to the flow data store 602 and the stateful network routing service 106. In other embodiments, the secondary flow data store may indicate that the flow validation information is not stored by the secondary flow data store and the flow data store 602 may generate the flow validation information.

At (5), the flow data store 602 may provide stored flow validation information to the stateful network routing service 106 based at least in part on the query of the stateful network routing service 106. The flow data store 602 may provide flow validation information obtained from the flow data store 602 based at least in part on the stateful network routing service 106 searching the flow data store 602 for the flow information. In some embodiments, the flow data store 602 may provide an indication to the stateful network routing service 106 that flow validation information is not stored at the flow data store 602. The stateful network routing service 106 may generate the flow validation information based on the indication of the flow data store 602.

At (6), the stateful network routing service 106 adds the flow validation information to a header of the packet in order to track whether the packet may be sent to an incorrect destination. The stateful network routing service 106 may add the flow validation information to the packet header during an encapsulation process. For example, the stateful network routing service 106 may receive the packet and encapsulate the packet with additional information such as a TCP information layer, an IP information layer, etc. Further, the stateful network routing service may cache the flow validation information, in association with the flow information of the packet, in a cache or data store associated with the stateful network routing service. For example, the flow validation information may be cached with the flow information such that the flow validation information is searchable based on the flow information and/or the flow information is searchable based on the flow validation information. At (7), the stateful network routing service 106 provides the encapsulated packet with the flow validation information to the network appliances 110 in order for the network appliances to perform operations on the encapsulated packet.

At (8), the network appliances 110 perform one or more operations on the encapsulated packet based on properties of the encapsulated packet and/or the operations requested and/or required by the source network host, the destination network host, and/or the network. For example, the network appliances 110 may perform one or more firewalling operations on the encapsulated packet based on a firewalling requirement by the source network host.

At (9), after performing the one or more operations on the encapsulated packet, the network appliances 110 provide a responsive packet to the stateful network routing service 106 for further transmission to the destination network host. The responsive packet may illustratively represent a modified version of the encapsulated packet to the stateful network routing service 106, created by the appliances 110 based at least in part on the one or more functions of the appliances 110 (e.g., application of firewall rules to the encapsulated packet). To ensure that the responsive packet has not been improperly modified (e.g., to include data of another customer), the appliance 110 can illustratively be configured to include within the responsive packet the flow validation information of the packet provided by the routing service 106.

At (10), the stateful network routing service 106 may query the cache associated with the stateful network routing service 106 to determine expected flow validation information for the received packet. As noted above, the cache may include both flow validation information and associated flow information for the packet transmitted to the appliances 110 from the routing service 106. Thus, the routing service 106 may obtain that flow validation information and associated flow information, which are expected to correspond with the flow validation information and flow information of the received packet. Thereafter, the routing service 106 may verify that flow validation information stored in the cache matches flow validation information included within the received packet, and that the flow information stored in the cache corresponds to the flow information within the received packet. In some embodiments, retrieval of the flow validation information or flow information from the cache may be facilitated based on information within the received packet. For example, the stateful network routing service 106 may parse the received packet to determine flow validation information and/or flow information of the packet. Illustratively, the stateful network routing service 106 may identify flow validation information included within a header of the received packet, and may search the cache based on the flow validation information in order to determine expected flow information for the packet. Alternatively, the stateful network routing service 106 may identify flow information included within a header of the received packet (e.g., within an inner header if the received packet includes an inner encapsulated packet), and may search the cache based on the flow information in order to determine expected flow validation information for the received packet.

At (11), the stateful network routing service 106 validates the received packet by validating that the flow validation information of the received packet corresponds to the expected flow validation information and that the flow information of the received packet corresponds to the expected flow information. Put in other terms, the routing service 106 may determine that if i) the flow validation information of the received packet matches flow validation information inserted into the packet provided by the routing service 106 to the appliances 110, and ii) a flow of the received packet (as identified by flow information of the received packet) corresponds to a flow of the packet provided by the routing service 106 to the appliances 110, then the appliance 110 has likely operated correctly and thus the packet is considered valid. In the instance that the flow validation information and flow information do not match, the routing service 106 may determine that the appliance has operated incorrectly (such as by including one customers data in traffic addressed to another customer). While validation is discussed herein with respect to the routing service 106, in some embodiments, the flow data store 602 or another component of the system may validate the received packet.

Based at least in part on a result of the stateful network routing service 106 validating the received packet, the stateful network routing service 106 may determine how to handle the received packet. For example, where the received packet is successfully validated, the stateful network routing service 106 forward the received packet to its destination. Where validation fails, the routing service 106 may be configured to drop the packet and/or a notice may be sent to the source network host, destination network host, etc. In some embodiments, the stateful network routing service 106 may determine that the packet and/or network appliances 110 are associated with a session termination case and may transmit the packet to the source network host without regard to the flow validation information. For example, where the stateful network routing service 106 determines that the flow validation information has been modified and determines that the network appliances 110 are associated with a session termination case, the stateful network routing service 106 may transmit the packet to the destination network host.

Figure 7:
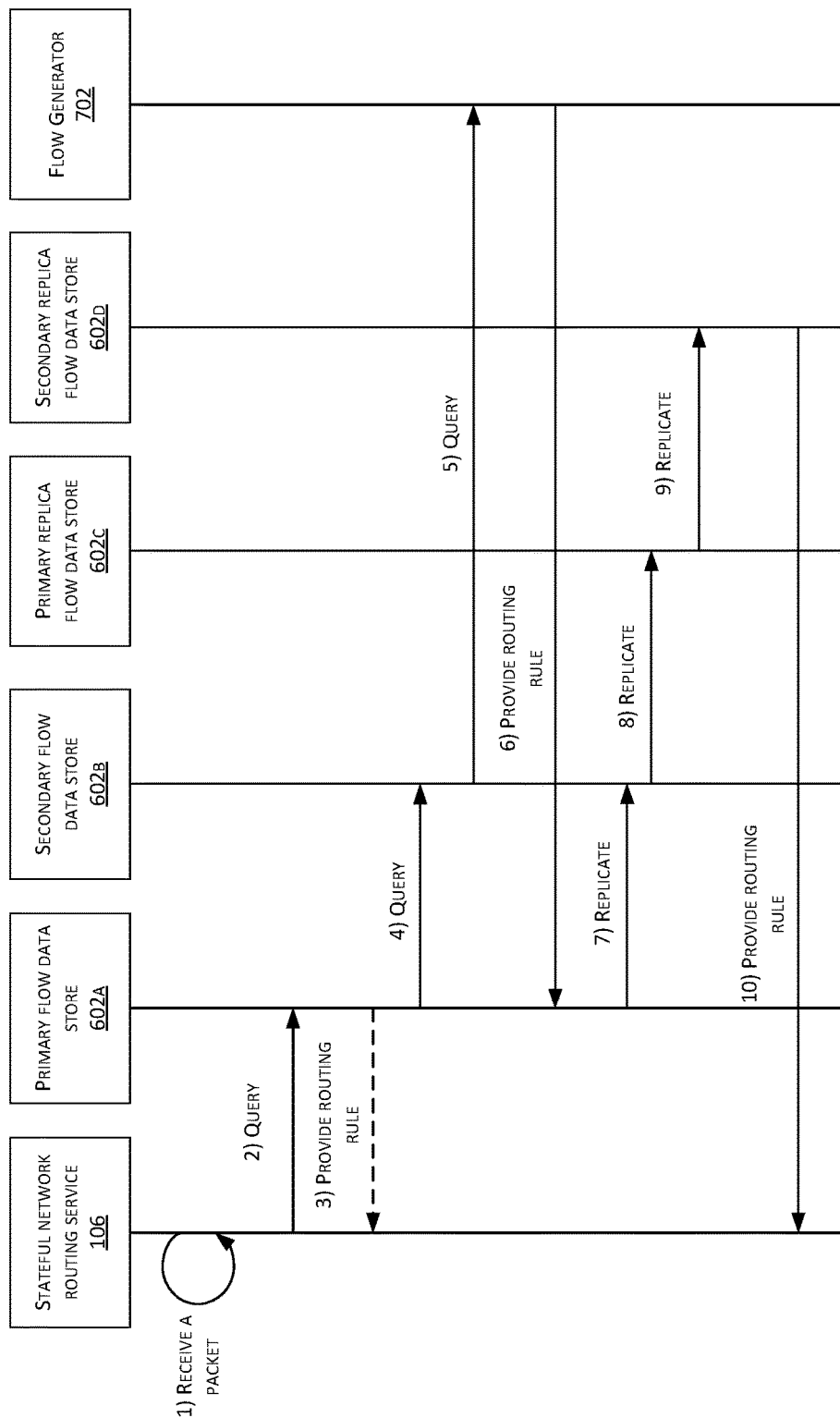
FIG. 7 depicts an example workflow for a stateful network routing service requesting flow data in response to receiving a packet.

With reference to FIG. 7, illustrative interactions 700 for determining flow information associated with a packet received at a stateful network routing service will now be described. Specifically, the illustrative interactions of FIG. 7 depict how the stateful network routing service 106 can obtain flow information (e.g., a designation of the source and destination of the packet) to determine a source and destination of the packet.

At (1), as described above, the stateful network routing service 106 may receive a packet corresponding to a flow of network traffic between a source network host and a destination network host in order to provide the packet to a network appliance for one or more operations. The stateful network routing service 106 may intercept the packet during a transmission of the packet between the source network host and the destination network host.

At (2), based at least in part on the stateful network routing service 106 receiving the packet, the stateful network routing service 106 may query a primary flow data store 602A in order to determine flow information associated with the packet. The primary flow data store 602A may store flow information corresponding to a plurality of packets received by the stateful network routing service. The primary flow data store 602A may further store a routing rule corresponding to the source and destination of the packet. The stateful network routing service 106 may query the primary flow data store 602A to determine if the routing rule is stored at the primary flow data store 602A.

At (3), the primary flow data store 602A may, in some embodiments, provide the routing rule to the stateful network routing service 106 based at least in part on the query by the stateful network routing service 106 identifying a routing rule stored in the primary flow data store 602A. The stateful network routing service 106 may receive the routing rule and transmit the packet to a network appliance based at least in part on the routing rule.

At (4), the primary flow data store 602A may query a secondary flow data store 602B based on a determination that the primary flow data store 602A does not include the routing rule. The primary flow data store 602A may query the secondary flow data store 602B to determine the routing rule associated with the packet.

At (5), based at least in part on determining that the secondary flow data store 602B does not contain the routing rule, the secondary flow data store 602B may query a flow generator 702 in order to generate a routing rule. The query to the flow generator 702 may include a request to generate and/or obtain the routing rule.

At (6), the flow generator 702 may provide the routing rule to the primary flow data store 602A for storage of the routing rule. The flow generator 702 may further provide an indication of the packet associated with the routing rule. For example, the flow generator 702 may provide information associated with a packet such as original flow information to the primary flow data store 602A. The primary flow data store 602A may store the flow information with the routing rule of the packet.

At (7), the primary flow data store 602A may transmit the routing rule to the secondary flow data store 602B in order to provide a backup of the routing rule. The primary flow data store 602A may also provide the original flow information to the secondary flow data store 602B.

At (8), the secondary flow data store 602B may transmit the routing rule to the primary replica flow data store 602C in order to provide a further backup of the routing rule. The secondary flow data store 602B may also provide the original flow information to the primary replica flow data store 602C.

At (9), the primary replica flow data store 602C may transmit the routing rule to the secondary replica flow data store 602D in order to provide a further backup of the routing rule. The primary replica flow data store 602C may also provide the original flow information to the secondary replica flow data store 602D.

At (10), the secondary replica flow data store 602D may transmit the routing rule to the stateful network routing service 106 in order to provide an updated source network host and an updated destination network host for the packet based on the routing rule. The stateful network routing service 106 may transmit the packet according to the routing rule. For example, where the routing rule includes a network appliance as a destination network host, the stateful network routing service 106 may transmit the packet to the network appliance.

Figure 8:
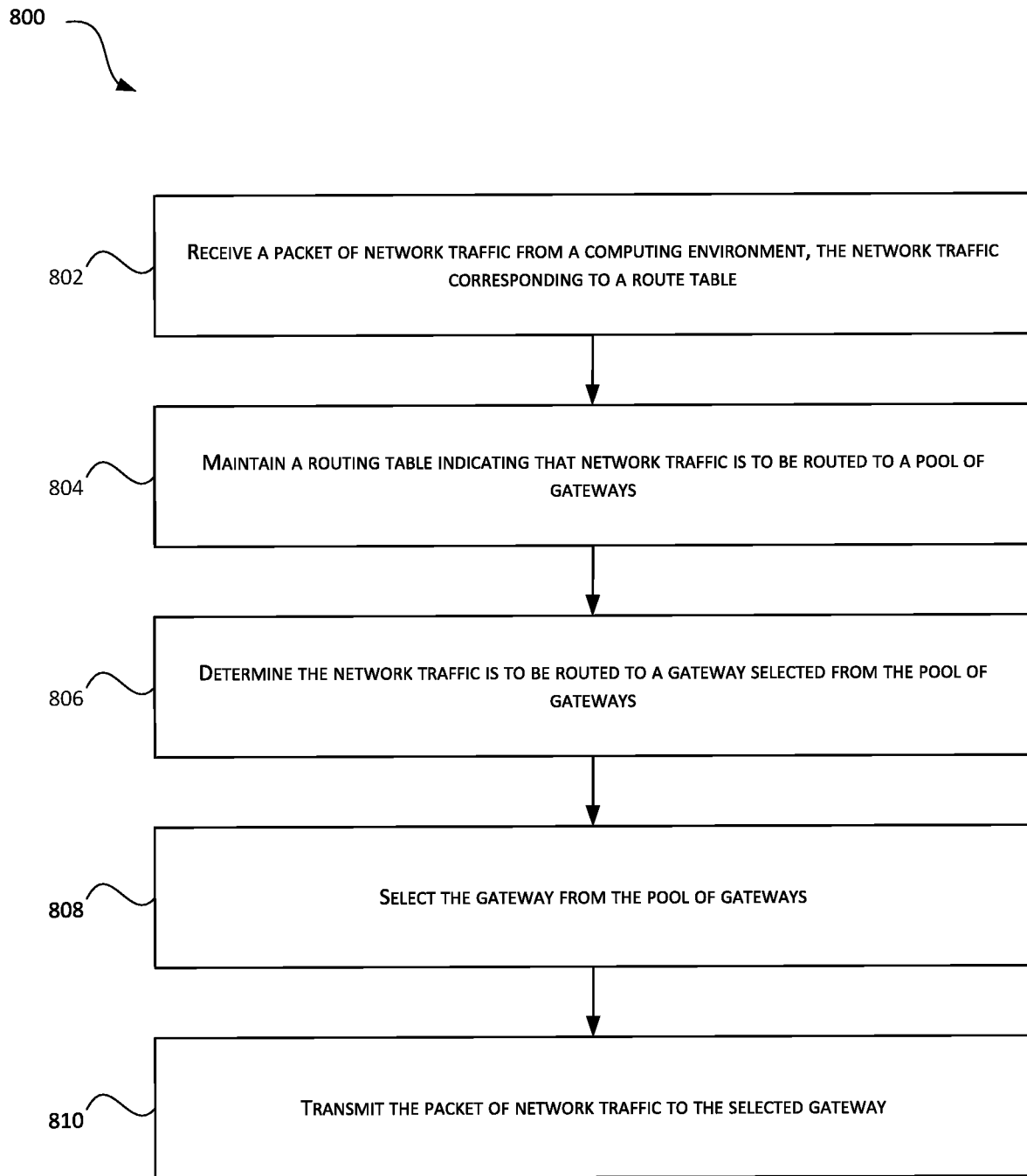
FIG. 8 is a flowchart of an example routine for receiving and passing a packet to a network appliance according to some embodiments.

FIG. 8 is a flowchart of an example routine for transmitting the packet to a stateful network routing service of a pool of stateful network routing services where the stateful network routing services can act as a network gateway for a plurality of network appliances. The routine 800 may be carried about by the network device 112B of FIG. 1.

The routine 800 begins at block 802, a network device in communication with one or more computing environments may receive (e.g., intercept) a packet of network traffic from a first computing environment. The packet may correspond to a flow of network traffic between computing environments. The packet may further correspond to a route table including flow information of the packet, the flow information of the packet corresponding to the flow of network traffic. For example, the route table may include the source network host and the destination network host of the packet. Further, the route table may include one or more next-hops of the packet corresponding to one or more intermediate destinations of the packet prior to the destination network host. The route table of the packet may include a next-hop of the packet that corresponds to a plurality of stateful network routing services represented by an IP address. Each of the plurality of stateful network routing services may correspond to a respective network location. Further, the plurality of stateful network routing services may also correspond to a respective network location. For example, the plurality of stateful network routing services includes a first and a second stateful network routing service, the plurality of stateful network routing services corresponds to an IP address 1.1.1.1, the first stateful network routing service corresponds to an IP address 1.1.1.2, and the second stateful network routing service corresponds to an IP address 1.1.1.3. The plurality of stateful network routing services may be scalable. For example, stateful network routing services can be scaled up or down based on user demand. A network device may receive the packet based at least in part on the route table of the packet including a next-hop corresponding to a plurality of stateful network routing services.

At block 804, the network device may maintain a route table with a next-hop indicating that network traffic is to be transmitted to a plurality of stateful network routing services. The route table may indicate that network traffic received by the network device is to be routed to the plurality of stateful network routing services.

At block 806, the network device may determine the network traffic is to be routed to a specific gateway of the plurality of gateways. The network device may determine the network traffic is to be routed to a specific stateful network routing service based on the flow information, the routing rule, etc.

At block 808, the network device may select a gateway from a plurality of gateways to transmit the packet to. The network device may select the stateful network routing service based on any hashing convention. The hashing may include selecting a healthy or available stateful network routing service for the packet. Further, the network device may select a healthy stateful network routing service that further corresponds to a healthy network appliance. In order to determine healthy stateful network routing services and/or healthy network appliance, the network device may track and/or monitor one or more stateful network routing services and/or network appliances to determine a corresponding health. The network device may periodically perform health-checks to determine healthy stateful network routing services, healthy stateful network routing services, and/or healthy network appliances. In some embodiments, the network device may periodically receive an update corresponding to the healthy stateful network routing services and/or healthy network appliances. For example, the network device may receive an update that a previously unhealthy stateful network routing service is a healthy stateful network routing service. In other embodiments, the network device may receive an update when a stateful network routing service and/or network appliance is determined to be unavailable and/or unhealthy. For example, the network device may receive an update that a previously healthy stateful network routing service is currently unhealthy. The network device may transmit subsequent packets of the flow of network traffic to the same stateful network routing service and/or network appliance. In some embodiments, prior to transmitting subsequent packets, the network device may determine that the stateful network routing service and/or network appliance is no longer available. Based on determining that the stateful network routing service is no longer available, the network device may transmit the packet (and subsequent packets of the flow of network traffic) to a second stateful network routing service. In some embodiments, a stateful network routing service corresponding to the second stateful network routing service may transmit the packet (and subsequent packets) to the same network appliance as the packet. In other embodiments, a stateful network routing service corresponding to the second stateful network routing service may transmit the packet (and subsequent packets) to a different network appliance.

At block 810, the network device may transmit the packet to the specific stateful network routing service based on the updated routing table of the packet. The packet may be transmitted to a specific network interface of a stateful network routing service may correspond to a client-facing network interface of the stateful network routing service that may further transmit the packet to a network appliance of a plurality of network appliances associated with the stateful network routing service. The network appliance and the computing environment may correspond to different security protocols. For example, the computing environment may correspond to a first security protocol and the network appliance may correspond to a second security protocol, the security protocols having different requirements, standards, protections, etc.

Figure 9:
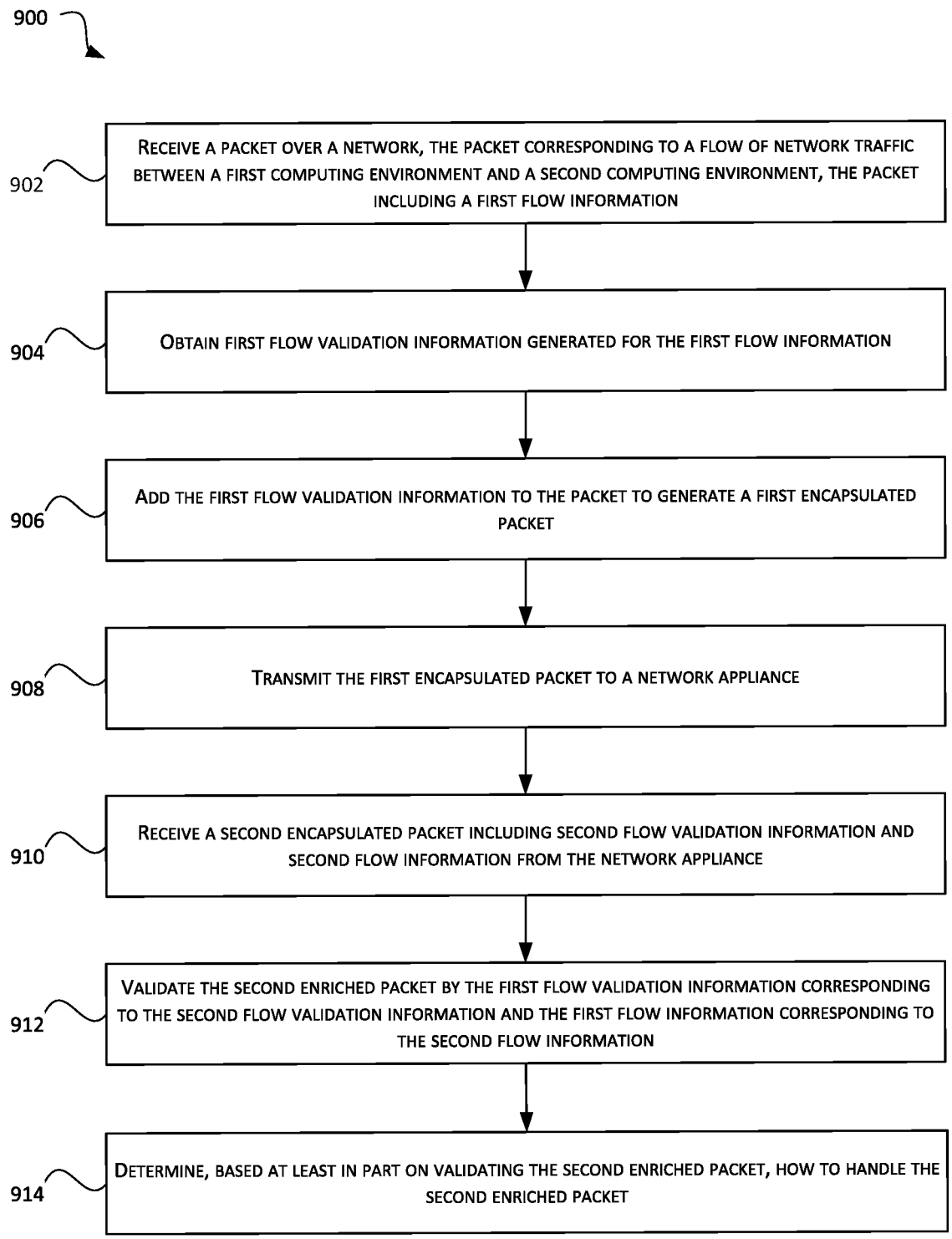
FIG. 9 is a flowchart of an example routine for passing an encapsulated packet to the network appliance according to some embodiments.

FIG. 9 is a flowchart of an example routine for enriching a packet with flow validation information prior to transmitting the packet to a network appliance. The routine 900 may be carried about by the stateful network routing service 106 of FIG. 1.

The routine 900 beings at block 902, a stateful network routing service in communication with one or more computing environments may receive a packet from a computing environment for transmission to a network appliance. The one or more computing environments may correspond to a plurality of tenants (i.e., a multi-tenancy system) and the stateful network routing service may receive packets corresponding to one or more tenants, clients, customers, etc. The packet may correspond to a flow of network traffic between the computing environments. The packet may further include flow information corresponding to the flow of network traffic (e.g., a source network host and a destination network host of the packet). The stateful network routing service may be configured to receive the packet and transmit the packet based on a routing rule.

At block 904, the stateful network routing service may obtain first flow validation information corresponding to the packet in order to identify the packet. The first flow validation information may further be generated for the flow information of the packet. For example, where the packet is being transmitted from a first computing environment to a second computing environment, the first flow validation information may be based on the first computing environment and the second computing environment. The first flow validation information may be obtained from a flow data store associated with the stateful network routing service. In some embodiments, the first flow validation information may be generated by the stateful network routing service and/or any other component of the system. The first flow validation information may be stored with the flow information in the flow data store and may be obtained based on the stateful network routing service receiving the packet.

At block 906, the stateful network routing service may add the first flow validation information to the packet in order to generate a first encapsulated packet. The first flow validation information may be stored in the first encapsulated packet. For example, the first flow validation information may be stored in a portion (e.g., layer) of the packet.

At block 908, the stateful network routing service may transmit the first encapsulated packet to the network appliance in order for the network appliance to perform one or more functions on the first encapsulated packet. The stateful network routing service may transmit the first encapsulated packet to the network appliance based at least in part on a routing rule associated with the packet.

At block 910, the stateful network routing service may receive a second encapsulated packet from the network appliance, the network appliance having performed one or more operations on the second encapsulated packet. The second encapsulated packet may include second flow information and second flow validation information. The second flow information may correspond to a source and destination of the second encapsulated packet and the second flow validation information may correspond to flow validation information associated with the second encapsulated packet.

At block 912, the stateful network routing service may validate the second encapsulated packet by the first flow validation information corresponding to the second flow validation information and the first flow information corresponding to the second flow information. Further, the stateful network routing service may compare the flow information of the second encapsulated packet with a plurality of flow information and the flow validation information of the second encapsulated packet with a plurality of flow validation information stored by a flow data store or cache corresponding to the stateful network routing service. In some embodiments, the stateful network routing service may search the flow data store for the second flow validation information and may determine that the second flow validation information matches the first flow validation information. Further, in validating the second encapsulated packet, the stateful network routing service may determine whether the second flow information of the second encapsulated packet matches the flow information of the first encapsulated packet. In other embodiments, the stateful network routing service may search the flow data store for the second flow information of the second encapsulated packet and may determine that the second flow information of the second encapsulated packet matches the first flow information of the first packet. Further, in validating the second encapsulated packet, the stateful network routing service may determine whether the second flow validation information matches the first flow validation information.

At block 914, the stateful network routing service may determine how to route the second encapsulated packet based on validating the second encapsulated packet. In the event that the stateful network routing service determines that the second encapsulated packet is not able to validate the second encapsulated packet (or invalidates the second encapsulated packet), the stateful network routing service may drop the second encapsulated packet and/or send a notification to the source network host and/or destination network host that the packet has been dropped. Further, in the event that the stateful network routing service validates the second encapsulated packet, the stateful network routing service may transmit the second encapsulated packet to the destination network host based at least in part on flow information associated with the second encapsulated packet. The stateful network routing service may further determine that a flow of network traffic has been discontinued (e.g., the flow of network traffic is not being used for a period of time). Further, the stateful network routing service may remove flow validation information corresponding to the flow of network traffic from the flow of network traffic based at least in part on the flow of network traffic being discontinued.

Figure 10:
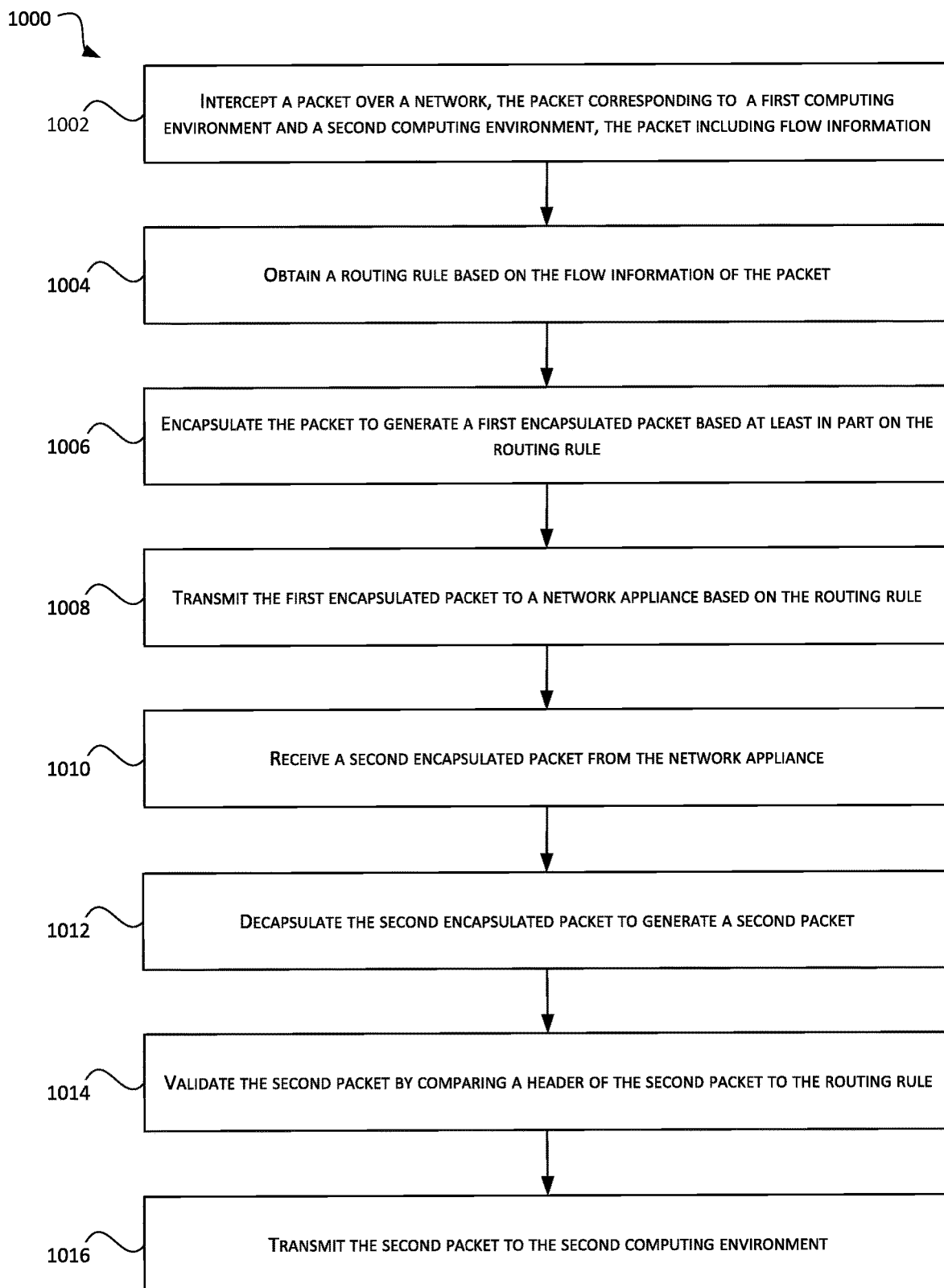
FIG. 10 is a flowchart of an example routine for passing a packet between network locations according to some embodiments.

FIG. 10 is a flowchart of an example routine for determining network transmission information based on a routing rule. The routine 1000 may be carried about by the stateful network routing service 106 of FIG. 1.

The routine 1000 beings at block 1002, as discussed above, a stateful network routing service may intercept a packet being transmitted between network hosts (e.g., a first computing environment and a second computing environment). The packet may correspond to a flow of network traffic between the first computing environment and the second computing environment. The packet may further include flow information based on a source and destination of the packet. The stateful network routing service may receive the packet via a client-facing network interface of the stateful network routing service based at least in part on receiving the packet from a network host.

At block 1004, based at least in part on receiving the packet via a client-facing network interface, the stateful network routing service may obtain a routing rule based on flow information of the packet in order to determine an updated source and destination of the packet. The flow information of the packet may be based on the first computing environment and the second computing environment. The stateful network routing service may parse the packet to determine the flow information of the packet and search a flow data store to determine an associated routing rule. The stateful network routing service may compare the flow information with the flow data store including a plurality of flow information. The stateful network routing service may further determine whether the flow information corresponds to flow information of the flow data store. Based on the flow information and the flow information of the flow data store, the stateful network routing service may determine that the routing rule has been generated and may obtain the routing rule from the flow data store. In some embodiments, based on the flow information and the flow information of the flow data store, the stateful network routing service may determine that the routing rule has not been previously been generated and may generate the routing rule based on the flow information.

At block 1006, the stateful network routing service may encapsulate based at least in part on the routing rule in order to transmit the encapsulated packet to the updated destination. The updated source and destination of the packet may be stored to an IP information layer of the encapsulated packet. In some embodiments, flow validation information may further be included in the encapsulated packet.

At block 1008, based on the routing rule, the stateful network routing service may transmit the encapsulated packet to a network appliance in order for the network appliance to perform one or more operations on the packet.

At block 1010, the stateful network routing service may receive a second encapsulated packet from the network appliance in order for the stateful network routing service to transmit the second encapsulated packet to a destination network host. The stateful network routing service may receive the second encapsulated packet via an appliance-facing network interface of the stateful network routing service based at least in part on receiving the second encapsulated packet from the network appliance.

At block 1012, the stateful network routing service may decapsulate the second encapsulated packet in order to generate a second packet based at least in part on receiving the second encapsulated packet via the appliance-facing network interface. Decapsulating the second encapsulated packet may include removing one or more layers of the second encapsulated packet. Further, decapsulating the second encapsulated packet may include removing the updated source and destination of the packet. In decapsulating the second encapsulated packet, an original source and destination of the packet may become the source and destination of the second packet. Decapsulating the second encapsulated packet may further include separating an outer header and an inner header of the second encapsulated packet, where the inner header of the second encapsulated packet is the header of the second packet.

At block 1014, based at least in part on receiving the second encapsulated packet via the appliance-facing network interface, the stateful network routing service may validate the second packet. The stateful network routing service may validate the second packet by comparing the header of the second packet to the routing rule. Comparing the header of the second packet to the routing rule may include determining a destination of the second packet based on the header. For example, the header of the second packet may include a second computing environment as the destination of the second packet. Further, based on the destination of the second packet, the stateful network routing service may determine a routing rule associated with the destination of the second packet. The stateful network routing service may further validate the second packet by comparing the routing rule with the network appliance that delivered the second encapsulated packet to the stateful network routing service. For example, in validating the second packet, the stateful network routing service may determine a network appliance associated with the routing rule and determine that the second encapsulated packet was received from the network appliance.

At block 1016, the stateful network routing service may transmit the second packet to a second computing environment corresponding to the original source and destination of the second packet.

Figure 11:
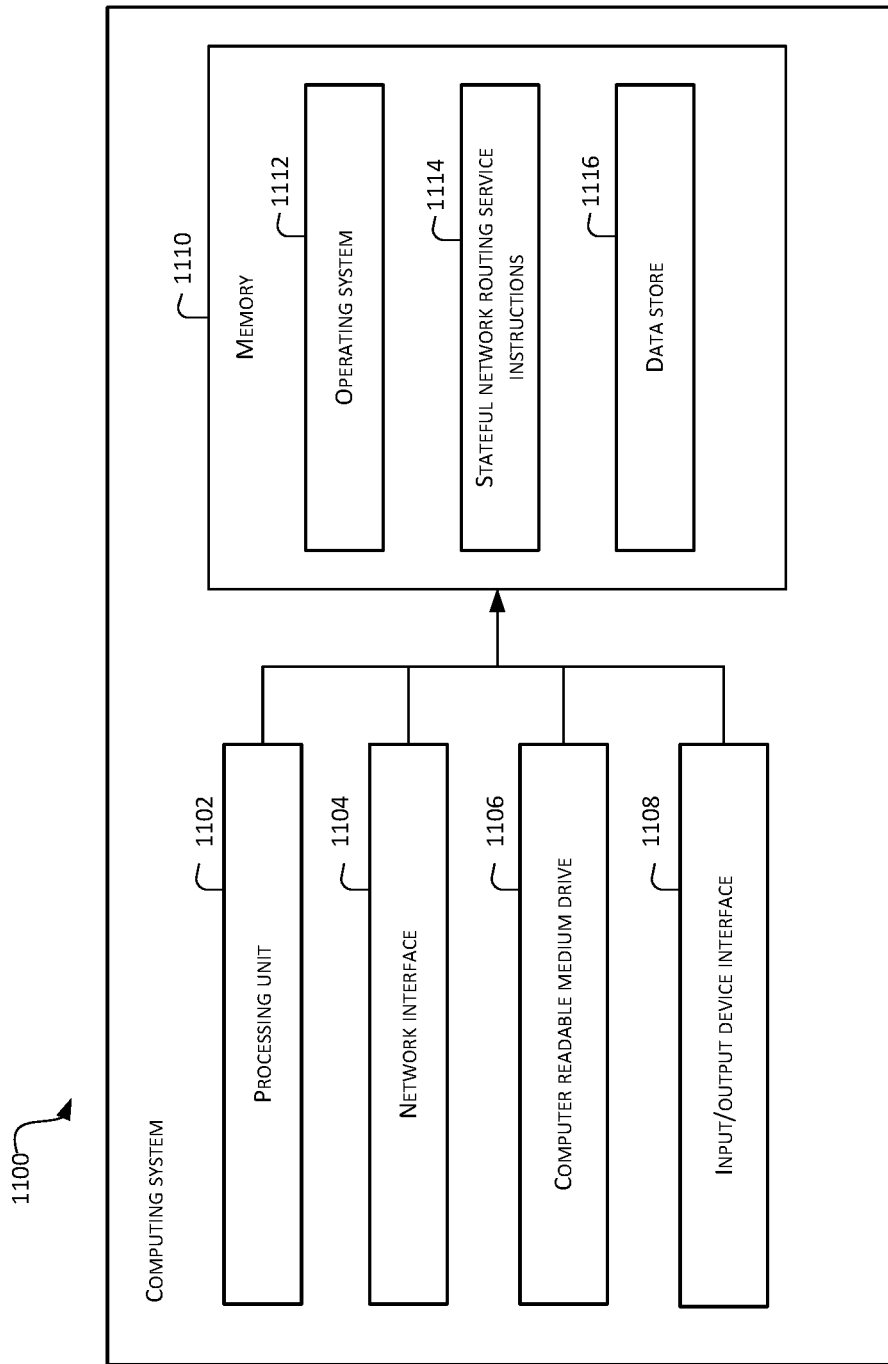
FIG. 11 shows an example computing device that may be used to implement aspects of the present disclosure.

FIG. 11 is a block diagram illustrating an example computing system, according to various embodiments. Computing system 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. In some embodiments, the computing system 1100 may correspond to the stateful network routing service 106. The computing system 1100 may include: one or more processing units 1102, such as physical central processing units ("CPUs"); one or more network gateways 1104, such as a network gateway cards ("NICs"); one or more computer-readable medium drives 1106, such as a high density disk ("HDDs"), solid state drives ("SDDs"), flash drives, and/or other persistent non-transitory computer-readable media; an input/output device gateway 1108, such as an IO gateway in communication with one or more microphones; and one or more computer-readable memories 1110, such as random access memory ("RAM") and/or other volatile non-transitory computer-readable media.

In various embodiments, computing system 1100 may be a uniprocessor system including one processing unit 1102, or a multiprocessor system including several processing units 1102 (e.g., two, four, eight, or another suitable number). Processing units 1102 may be any suitable processors capable of executing instructions. For example, in various embodiments, processing units 1102 may be general-purpose or embedded processors implementing any of a variety of instruction set architectures (ISAs), such as the x86, PowerPC, SPARC, or MIPS ISAs, or any other suitable ISA. In multiprocessor systems, each of the processing units 1102 may commonly, but not necessarily, implement the same ISA. The computing system 1100 also includes one or more network communication devices (e.g., network gateway 1104) for communicating with other systems and/or components over a communications network (e.g. Internet, LAN, etc.).

In one embodiment, I/O device gateway 1108 may coordinate I/O traffic between the processing unit 1102, computer-readable memory 1110, and any peripheral devices in the system, including through network gateway 1104 or other peripheral gateways. In some embodiments, I/O device gateway 1108 may perform any necessary protocol, timing or other data transformations to convert data signals from one component (e.g., computer-readable memory 1110) into a format suitable for use by another component (e.g., processing unit 1102). In some embodiments, I/O device gateway 1108 may include support for devices attached through various types of peripheral buses, such as a variant of the Peripheral Component Interconnect (PCI) bus standard or the Universal Serial Bus (USB) standard, for example. In some embodiments, the function of I/O device gateway 1108 may be split into two or more separate components, such as a north bridge and a south bridge, for example. Also, in some embodiments, some or all of the functionality of I/O device gateway 1108, such as a gateway to computer-readable memory 1110, may be incorporated directly into processing unit 1102.

The network gateway 1104 may allow data to be exchanged between computing system 1100 and other devices attached to a network, such as other computer systems, for example. In addition, network gateway 1104 may allow communication between computing system 1100 and various I/O devices and/or remote storage (which may represent, for example, data stores 1116). Input/output devices may, in some embodiments, include one or more display terminals, keyboards, keypads, touchpads, scanning devices, voice, or optical recognition devices, or any other devices suitable for entering or retrieving data by one or more computing systems 1100. Multiple input/output devices may be present in computing system 1100 or may be distributed on various nodes of a distributed system that includes computing system 1100. In some embodiments, similar input/output devices may be separate from computing system 1100 and may interact with one or more nodes of a distributed system that includes computing system 1100 through a wired or wireless connection, such as over network gateway 1104. Network gateway 1104 may commonly support one or more wireless networking protocols (e.g., Wi-Fi/IEEE 802.11, or another wireless networking standard). However, in various embodiments, network gateway 1104 may support communication via any suitable wired or wireless general data networks, such as other types of Ethernet networks, for example. Additionally, network gateway 1104 may support communication via telecommunications/telephony networks such as analog voice networks or digital fiber communications networks, via storage area networks such as Fibre Channel SANs, or via any other suitable type of network and/or protocol.

The processing unit 1102 can receive information and instructions from other computing systems or services via the network gateway 1104. The network gateway 1104 can also store data directly to the computer-readable memory 1110. The processing unit 1102 can communicate to and from the computer-readable memory 1110, execute instructions and process data in the computer-readable memory 1110, etc.

The computer-readable memory 1110 may include computer program instructions that the processing unit 1102 executes in order to implement one or more embodiments. The computer-readable memory 1110 can store an operating system 1112 that provides computer program instructions for use by the processing unit 1102 in the general administration and operation of the computing system 1100. The computer-readable memory 1110 can further include computer program instructions and other information for implementing aspects of the present disclosure. For example, in one embodiment, the computer-readable memory 1110 may include stateful network routing service instructions 1114. As another example, the computer-readable memory 1110 may include a data store 1116. In some embodiments, the data store 1116 may be a flow data store.

It will be understood that other applications may be stored in the computer-readable memory 1110. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the computer-readable memory 1110 and are executable by the processing unit 1102. In this respect, the term "executable" means a program file that is in a form that can ultimately be run by the processing unit 1102. Examples of executable programs may be, for example, a compiled program that can be translated into machine code in a format that can be loaded into a random access portion of the computer-readable memory 1110 and run by the processing unit 1102, source code that may be expressed in proper format such as object code that is capable of being loaded into a random access portion of the computer-readable memory 1110 and executed by the processing unit 1102, or source code that may be interpreted by another executable program to generate instructions in a random access portion of the computer-readable memory 1110 to be executed by the processing unit 1102, etc. An executable program may be stored in any portion or component of the computer-readable memory 1110 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have a gateway described in a machine-processable format, such as the Web Services Description Language (WSDL). Other systems may interact with the network-based service in a manner prescribed by the description of the network-based service's gateway. For example, the network-based service may define various operations that other systems may invoke, and may define a particular application programming gateway (API) to which other systems may be expected to conform when requesting the various operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions. Further, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Various example embodiments of the disclosure can be described by the following clauses:

Clause 1: A system, comprising:
- a first fleet of network appliances operating within a first availability zone of a cloud provider network;
- a second fleet of network appliances operating within a second availability zone of the cloud provider network;
- a first gateway operating within the first availability zone, the first gateway configured to route traffic to particular network appliances within the first fleet;
- a second gateway operating within the second availability zone, the second gateway configured to route traffic to particular network appliances within the second fleet;
- a virtual private environment of a cloud computing environment associated with a routing rule indicating that traffic exiting the virtual private environment is to be processed a network appliance of the first or second fleets of network appliances; and
- a network device associated with the virtual private environment configured to:
  - maintain a routing table indicating that traffic exiting the virtual private environment is to be routed to a pool of gateways associated with the first and second fleets of network appliances, the pool of gateways including the first gateway and the second gateway,
  - receive network traffic from the virtual private environment addressed to a destination,
  - based at least in part on the routing table, determine that the network traffic is to be routed to a gateway selected from the pool of gateways,
  - select the gateway from the pool of gateways to which to route the network traffic, wherein the selected gateway is one of the first gateway or the second gateway, and
  - route the network traffic to the selected gateway, wherein the selected gateway is configured to transmit the network traffic to a network appliance of the corresponding one of the first or second fleets of network appliances for processing prior to transmitting the network traffic to the destination.

Clause 2: The system of Clause 1, wherein the network device is further configured to:
- receive subsequent network traffic from the virtual private environment addressed to a destination;
- based at least in part on routing the network traffic to the selected gateway, determine that the subsequent network traffic should be routed to the selected gateway;
- determine that the selected gateway is unavailable, wherein the selected gateway is the first gateway;
- based at least in part on the routing table, determine that the subsequent network traffic is to be routed to a gateway selected from the pool of gateways;
- select the second gateway from the pool of gateways to which to route the subsequent network traffic, based at least in part on determining that the first gateway is unavailable; and
- route the network traffic to the second gateway.

Clause 3: The system of Clause 1, wherein the network device is further configured to determine that a zonal outage has occurred, wherein the zonal outage indicates that one or more of a gateway, network appliance, or a fleet of network appliances is unavailable.

Clause 4: The system of Clause 1, wherein a number of fleets of network appliances are scalable.

Clause 5: A system, comprising:
- a plurality of network appliances distributed among a plurality of fleets of network appliances, wherein each fleet of network appliances includes a respective subset of the plurality of network appliances and a respective gateway, wherein each fleet of network appliances operates within a respective availability zone of a cloud provider network, wherein the respective gateway is configured to route traffic to particular network appliances within the respective fleet of network appliances;
- a plurality of virtual private environments of a cloud computing environment, wherein a virtual private environment of the plurality of virtual private environments is associated with a routing rule indicating that traffic exiting the virtual private environment is to be processed a network appliance of a first fleet of network appliances; and
- a network device associated with the computing environment and configured to:
  - based at least in part on the routing rule, maintain a routing table indicating that traffic exiting the virtual private environment is to be routed to a pool of gateways associated with the plurality of fleets of network appliances,
  - receive network traffic from the virtual private environment addressed to a destination,
  - based at least in part on the routing table, select a gateway from the pool of gateways to which to route the network traffic, and
  - route the network traffic to the selected gateway, wherein the selected gateway is configured to transmit the network traffic to a network appliance of the corresponding one of the plurality of fleets of network appliances for processing prior to transmitting the network traffic to the destination.

Clause 6: The system of Clause 5, wherein the network device is further configured to:
- receive subsequent network traffic from the virtual private environment;
- based at least in part on routing the network traffic to the selected gateway, determine that the subsequent network traffic should be routed to the selected gateway;
- determine that the selected gateway is unavailable, wherein the selected gateway is a first gateway;
- based at least in part on the routing table, determine that the subsequent network traffic is to be routed to a gateway selected from the pool of gateways;
- select a second gateway from the pool of gateways to which to route the subsequent network traffic, based at least in part on determining that the first gateway is unavailable; and
- route the network traffic to the second gateway.

Clause 7: The system of Clause 5, wherein the network device is further configured to:
- receive subsequent network traffic from the virtual private environment;
- based at least in part on routing the network traffic to the selected gateway, determine that the subsequent network traffic should be routed to the selected gateway;

determine that the network appliance is unavailable;
based at least in part on the routing table, determine that the subsequent network traffic is to be routed to a gateway selected from the pool of gateways;
select a second gateway from the pool of gateways to which to route the subsequent network traffic, based at least in part on determining that the network appliance is unavailable; and
route the network traffic to the second gateway, wherein the selected gateway is configured to transmit the network traffic to a second network appliance of the plurality of network appliances.

Clause 8: The system of Clause 5, wherein a second virtual private environment of the plurality of virtual private environments is associated with a second routing rule indicating that network traffic exiting the second virtual private environment is to be processed by a network appliance of the plurality of fleets of network appliances, wherein the network device is further configured to:
based at least in part on the second routing rule, maintain a second routing table indicating that traffic exiting the second virtual private environment is to be routed to the pool of gateways associated with the plurality of fleets of network appliances,
receive network traffic from the second virtual private environment and addressed to a second destination,
based at least in part on the routing table, determine that the network traffic is to be routed to the selected gateway,
route the network traffic to the selected gateway, wherein the selected gateway is configured to transmit the network traffic to a second network appliance of the corresponding one of the plurality of fleets of network appliances for processing prior to transmitting the network traffic to the second destination.

Clause 9: The system of Clause 5, the network device further configured to:
perform a health-check on one or more gateways of the pool of gateways;
determine that a second gateway is unavailable based on the health-check; and
remove the second gateway from the pool of gateways.

Clause 10: The system of Clause 5, the network device further configured to:
perform a health-check on a second gateway, wherein the second gateway is not included in the pool of gateways;
determine the second gateway is available based on the health-check; and
add the second gateway to the pool of gateways.

Clause 11: The system of Clause 5, wherein the network device is further configured to generate an updated route table based at least in part on selecting the gateway from the pool of gateways to which to route the network traffic, wherein the updated route table indicates that traffic exiting the virtual private environment is to be routed to the selected gateway.

Clause 12: The system of Clause 5, wherein determining that the network traffic is to be routed to the gateway selected from the pool of gateways is based at least in part on evenly distributing a plurality of network traffic to the pool of gateways.

Clause 13: The system of Clause 5, wherein a number of the plurality of fleets of network appliances are scalable.

Clause 14: The system of Clause 5, wherein the virtual private environment corresponds to a first security protocol and the network appliance corresponds to a second security protocol.

Clause 15: A computer-implemented method comprising:
receiving network traffic from a virtual private environment and addressed to a destination, the virtual private environment of a cloud computing environment associated with a routing rule indicating that network traffic exiting the virtual private environment is to be processed by a network appliance of one of a plurality of fleets of network appliances, wherein a plurality of network appliances are distributed among the plurality of fleets of network appliances, wherein each fleet of network appliances corresponds to a particular availability zone and includes a respective subset of the plurality of network appliances and a respective gateway, wherein the respective gateway is configured to route traffic to particular network appliances within the respective fleet;
maintaining a routing table indicating that network traffic exiting the virtual private environment is to be routed to a pool of gateways,
based at least in part on the routing table, determining that the network traffic is to be routed to a gateway selected from the pool of gateways,
selecting the gateway from the pool of gateways to which to route the network traffic, and
routing the network traffic to the selected gateway.

Clause 16: The computer-implemented method of Clause 15 further comprising:
receive subsequent network traffic from the virtual private environment addressed to the destination;
based at least in part on routing the network traffic to the selected gateway, determine that the subsequent network traffic should be routed to the selected gateway;
determine that the selected gateway is unavailable, wherein the selected gateway is a first gateway;
based at least in part on the routing table, determine that the subsequent network traffic is to be routed to a gateway selected from the pool of gateways;
select a second gateway from the pool of gateways to which to route the subsequent network traffic, based at least in part on determining that the first gateway is unavailable; and
route the network traffic to the second gateway.

Clause 17: The computer-implemented method of Clause 15 further comprising:
performing a health-check on one or more gateways of the pool of gateways;
determining that a second gateway is unavailable based on the health-check; and
removing the second gateway from the pool of gateways.

Clause 18: The computer-implemented method of Clause 15 further comprising:
performing a health-check on a second gateway, wherein the second gateway is not included in the pool of gateways;
determining the second gateway is available based on the health-check; and
adding the second gateway to the pool of gateways.

Clause 19: The computer-implemented method of Clause 15, wherein determining that the network traffic is to be routed to the gateway selected from the pool of gateways is based at least in part on evenly distributing a plurality of network traffic to the pool of gateways.

Clause 20: The computer-implemented method of Clause 15, wherein the selected gateway is configured to transmit the network traffic to a network appliance of the corresponding one of the plurality of fleets of network appliances for processing prior to transmitting the network traffic to the destination, wherein the virtual private environment corresponds to a first security protocol and the network appliance corresponds to a second security protocol.

Various additional example embodiments of the disclosure can be described by the following clauses:

Clause 1: A system, comprising:
  a network comprising a first network environment and a second network environment, wherein the first network environment and the second network environment are virtual private network environments;
  a network appliance; and
  a stateful network routing service configured to route data between the first network environment, the second network environment, and the fleet of network appliances, the stateful network routing service configured to:
    obtain a routing rule corresponding to traffic associated with the first network environment, the routing rule indicating that the traffic is to be encapsulated and rerouted to the network appliance,
    receive a first packet from the first network environment, the packet addressed to the second network environment,
    encapsulate the first packet to generate a first encapsulated packet based at least in part on the routing rule, wherein the first encapsulated packet is addressed to the network appliance,
    transmit the first encapsulated packet to the network appliance via an appliance-specific network gateway of the stateful network routing service,
    receive a second encapsulated packet from the network appliance via the appliance-specific network gateway of the stateful network routing service,
    determine how to route the second encapsulated packet based at least in part on receiving the second encapsulated packet via the appliance-specific network gateway of the stateful network routing service, wherein to determine how to route the second encapsulated packet, the stateful network routing service is configured to:
      decapsulate the second encapsulated packet to generate a second packet and identify a destination of the second packet based on a header of the second packet, and
      validate the destination by comparing the header of the second packet to the routing rule, and
    transmit the second packet according to the header of the second packet.

Clause 2: The system of Clause 1, wherein to decapsulate the second encapsulated packet the stateful network routing service is configured to separate an outer header and an inner header of the second encapsulated packet.

Clause 3: The system of Clause 1, wherein to obtain the routing rule the stateful network routing service is configured to:
  obtain a first routing rule, the first routing rule corresponding to network traffic from the first network environment to the second network environment; and
  obtain a second routing rule, the second routing rule corresponding to network traffic from the second network environment to the first network environment.

Clause 4: The system of Clause 1, the stateful network routing service is further configured to look up the routing rule based on the first network environment, wherein the routing rule is stored in a data store of the stateful network routing service.

Clause 5: A system, comprising:
  a data store including computer-executable instructions; and
  one or more computing devices configured to execute the computer-executable instructions to implement a stateful network routing service, wherein execution of the computer-executable instructions causes the one or more computing devices to:
    receive a first packet from a first network device to a second network device,
    obtain a routing rule, wherein the routing rule indicates that the first packet is to be routed to a network appliance of the fleet of network appliances,
    encapsulate the first packet to generate a first encapsulated packet based at least in part on the routing rule,
    transmit the first encapsulated packet to the network appliance based at least in part on the routing rule,
    receive a second encapsulated packet from the network appliance via an appliance-specific network gateway of the stateful network routing service,
    determine how to route the second encapsulated packet based at least in part on receiving the second encapsulated packet via the appliance-specific network gateway of the stateful network routing service, wherein to determine how to route the second encapsulated packet, the stateful network routing service is configured to decapsulate the second encapsulated packet to generate a second packet with a header including information on how to route the packet, wherein the header of the second packet identifies the first network device as a source of the packet and the second network device as a destination for the packet, and
    transmit the second packet to the second network device.

Clause 6: The system of Clause 5, wherein to decapsulate the second encapsulated packet the stateful network routing service is configured to separate an outer header and an inner header of the second encapsulated packet.

Clause 7: The system of Clause 5, wherein to decapsulate the second encapsulated packet the stateful network routing service is configured to separate an outer header and an inner header of the second encapsulated packet, wherein the inner header of the second encapsulated packet corresponds to the header of the second packet.

Clause 8: The system of Clause 5, the stateful network routing service is further configured to look up the routing rule, wherein the routing rule is stored in a data store of the stateful network routing service.

Clause 9: The system of Clause 5, wherein the stateful network routing service receives the first packet from the first network device via a client-specific network gateway of the stateful network routing service.

Clause 10: The system of Clause 5, wherein the stateful network routing service is further configured to validate a destination of the second packet by comparing the header of the second packet to the routing rule.

Clause 11: The system of Clause 5, wherein to obtain the routing rule, the stateful network routing service is configured to:
obtain a first routing rule, the first routing rule corresponding to network traffic from the first network device to the second network device; and
obtain a second routing rule, the second routing rule corresponding to network traffic from the second network device to the first network device.

Clause 12: The system of Clause 5, the stateful network routing service further configured to:
compare the flow information with a plurality of flow information; and
determine that the routing rule corresponding to the flow information has not been previously generated based at least on comparing the flow information with the plurality of flow information;
wherein obtaining the routing rule comprises generating the routing rule based at least in part on the flow information.

Clause 13: A computer-implemented method comprising
receiving, by a stateful network routing service, a first packet of network traffic from a first network device and addressed to a second network device via a client-specific network gateway of the stateful network routing service;
determining how to route the first packet based at least in part on receiving the first packet via the client-specific network gateway of the stateful network routing service, wherein determining how to route the first packet includes:
obtaining, by the stateful network routing service, a routing rule, wherein the routing rule corresponds to the first network device; and
encapsulating the first packet to generate a first encapsulated packet based at least in part on the routing rule, wherein the first encapsulated packet is addressed to a network appliance;
transmitting, by the stateful network routing service, the first encapsulated packet to the network appliance based at least in part on the routing rule;
receiving, by the stateful network routing service, a second encapsulated packet from the network appliance via an appliance-specific network gateway of the stateful network routing service;
determining how to route the second encapsulated packet based at least in part on receiving the second encapsulated packet via the appliance-specific network gateway of the stateful network routing service, wherein determining how to route the second encapsulated packet includes decapsulating, by the stateful network routing service, the second encapsulated packet to generate a second packet including a header identifying the second network device as a destination to which to route the packet; and
transmitting, by the stateful network routing service, the second packet to the second network device.

Clause 14: The computer-implemented method of Clause 13, wherein decapsulating the second encapsulated packet comprises separating an outer header and an inner header of the second encapsulated packet.

Clause 15: The computer-implemented method of Clause 13, wherein decapsulating the second encapsulated packet comprises separating an outer header and an inner header of the second encapsulated packet, wherein the inner header of the second encapsulated packet corresponds to the header of the second packet.

Clause 16: The computer-implemented method of Clause 13, further comprising validating the destination of the second packet by comparing the header of the second packet to the routing rule.

Clause 17: The computer-implemented method of Clause 13, wherein obtaining the routing rule comprises:
obtaining a first routing rule, the first routing rule corresponding to network traffic from the first network device to the second network device; and
obtaining a second routing rule, the second routing rule corresponding to network traffic from the second network device to the first network device.

Clause 18: The computer-implemented method of Clause 13 further comprising:
comparing the flow information with a plurality of flow information; and
determining that the routing rule corresponding to the flow information has not been previously generated based at least on comparing the flow information with the plurality of flow information;
wherein obtaining the routing rule comprises generating the routing rule based at least in part on the flow information.

Clause 19: The computer-implemented method of Clause 13 further comprising:
comparing the flow information with a plurality of flow information; and
determining that the routing rule corresponding to the flow information has previously been generated based at least on comparing the flow information with the plurality of flow information;
wherein obtaining the routing rule comprises obtaining the routing rule from a data store.

Clause 20: The computer-implemented method of Clause 13, wherein the first packet and a subsequent packet correspond to a same routing rule.

Various additional example embodiments of the disclosure can be described by the following clauses:

Clause 1: A system, comprising:
a network comprising a first network environment and a second network environment, wherein the first network environment and the second network environment are virtual private network environments;
a network appliance; and
a stateful network routing service configured to route data between the first network environment, the second network environment, and the fleet of network appliances, the stateful network routing service configured to:
obtain a routing rule corresponding to traffic associated with the first network environment, the routing rule indicating that the traffic is to be encapsulated and rerouted to the network appliance,
receive a first packet from the first network environment, the packet addressed to the second network environment,
encapsulate the first packet to generate a first encapsulated packet based at least in part on the routing rule, wherein the first encapsulated packet is addressed to the network appliance,
transmit the first encapsulated packet to the network appliance via an appliance-specific network gateway of the stateful network routing service, receive a second encapsulated packet from the network appliance via the appliance-specific network gateway of the stateful network routing service, determine how to route the second encapsulated packet based at least in part on receiving the second encapsulated packet via the appliance-specific network gateway of the stateful network routing service, wherein to determine how to route the second encapsulated packet, the stateful network routing service is configured to:

decapsulate the second encapsulated packet to generate a second packet and identify a destination of the second packet based on a header of the second packet, and validate the destination by comparing the header of the second packet to the routing rule, and transmit the second packet according to the header of the second packet.

Clause 2: The system of Clause 1, wherein to decapsulate the second encapsulated packet the stateful network routing service is configured to separate an outer header and an inner header of the second encapsulated packet.

Clause 3: The system of Clause 1, wherein to obtain the routing rule the stateful network routing service is configured to:

obtain a first routing rule, the first routing rule corresponding to network traffic from the first network environment to the second network environment; and obtain a second routing rule, the second routing rule corresponding to network traffic from the second network environment to the first network environment.

Clause 4: The system of Clause 1, the stateful network routing service is further configured to look up the routing rule based on the first network environment, wherein the routing rule is stored in a data store of the stateful network routing service.

Clause 5: A system comprising:

a data store including computer-executable instructions; and one or more computing devices configured to execute the computer-executable instructions to implement a stateful network routing service, wherein execution of the computer-executable instructions causes the one or more computing devices to:

receive a first packet from a first network device to a second network device, obtain a routing rule, wherein the routing rule indicates that the first packet is to be routed to a network appliance of the fleet of network appliances, encapsulate the first packet to generate a first encapsulated packet based at least in part on the routing rule, transmit the first encapsulated packet to the network appliance based at least in part on the routing rule, receive a second encapsulated packet from the network appliance via an appliance-specific network gateway of the stateful network routing service, determine how to route the second encapsulated packet based at least in part on receiving the second encapsulated packet via the appliance-specific network gateway of the stateful network routing service, wherein to determine how to route the second encapsulated packet, the stateful network routing service is configured to decapsulate the second encapsulated packet to generate a second packet with a header including information on how to route the packet, wherein the header of the second packet identifies the first network device as a source of the packet and the second network device as a destination for the packet, and transmit the second packet to the second network device.

Clause 6: The system of Clause 5, wherein to decapsulate the second encapsulated packet the stateful network routing service is configured to separate an outer header and an inner header of the second encapsulated packet.

Clause 7: The system of Clause 5, wherein to decapsulate the second encapsulated packet the stateful network routing service is configured to separate an outer header and an inner header of the second encapsulated packet, wherein the inner header of the second encapsulated packet corresponds to the header of the second packet.

Clause 8: The system of Clause 5, the stateful network routing service is further configured to look up the routing rule, wherein the routing rule is stored in a data store of the stateful network routing service.

Clause 9: The system of Clause 5, wherein the stateful network routing service receives the first packet from the first network environment via a client-specific network gateway of the stateful network routing service.

Clause 10: The system of Clause 5, wherein the stateful network routing service is further configured to validate a destination of the second packet by comparing the header of the second packet to the routing rule.

Clause 11: The system of Clause 5, wherein to obtain the routing rule, the stateful network routing service is configured to:

obtain a first routing rule, the first routing rule corresponding to network traffic from the first network environment to the second network environment; and obtain a second routing rule, the second routing rule corresponding to network traffic from the second network environment to the first network environment.

Clause 12: The system of Clause 5, the stateful network routing service further configured to:

compare the flow information with a plurality of flow information; and determine that the routing rule corresponding to the flow information has not been previously generated based at least on comparing the flow information with the plurality of flow information;

wherein obtaining the routing rule comprises generating the routing rule based at least in part on the flow information.

Clause 13: A computer-implemented method comprising receiving, by a stateful network routing service, a first packet of network traffic from a first network device and addressed to a second network device via a client-specific network gateway of the stateful network routing service;

determining how to route the first packet based at least in part on receiving the first packet via the client-specific network gateway of the stateful network routing service, wherein determining how to route the first packet includes:

obtaining, by the stateful network routing service, a routing rule, wherein the routing rule corresponds to the first network device; and encapsulating the first packet to generate a first encapsulated packet based at least in part on the routing rule, wherein the first encapsulated packet is addressed to a network appliance;

transmitting, by the stateful network routing service, the first encapsulated packet to the network appliance based at least in part on the routing rule;

receiving, by the stateful network routing service, a second encapsulated packet from the network appliance via an appliance-specific network gateway of the stateful network routing service;

determining how to route the second encapsulated packet based at least in part on receiving the second encapsulated packet via the appliance-specific network gateway of the stateful network routing service, wherein determining how to route the second encapsulated packet includes decapsulating, by the stateful network routing service, the second encapsulated packet to generate a second packet including a header identifying the second network device as a destination to which to route the packet; and transmitting, by the stateful network routing service, the second packet to the second network device.

Clause 14: The computer-implemented method of Clause 13, wherein decapsulating the second encapsulated packet comprises separating an outer header and an inner header of the second encapsulated packet.

Clause 15: The computer-implemented method of Clause 13, wherein decapsulating the second encapsulated packet comprises separating an outer header and an inner header of the second encapsulated packet, wherein the inner header of the second encapsulated packet corresponds to the header of the second packet.

Clause 16: The computer-implemented method of Clause 13, further comprising validating the destination of the second packet by comparing the header of the second packet to the routing rule.

Clause 17: The computer-implemented method of Clause 13, wherein obtaining the routing rule comprises:
obtaining a first routing rule, the first routing rule corresponding to network traffic from the first network device to the second network device; and
obtaining a second routing rule, the second routing rule corresponding to network traffic from the second network device to the first network device.

Clause 18: The computer-implemented method of Clause 13 further comprising:
comparing the flow information with a plurality of flow information; and
determining that the routing rule corresponding to the flow information has not been previously generated based at least on comparing the flow information with the plurality of flow information;
wherein obtaining the routing rule comprises generating the routing rule based at least in part on the flow information.

Clause 19: The computer-implemented method of Clause 13 further comprising:
comparing the flow information with a plurality of flow information; and
determining that the routing rule corresponding to the flow information has previously been generated based at least on comparing the flow information with the plurality of flow information;
wherein obtaining the routing rule comprises obtaining the routing rule from a data store.

Clause 20: The computer-implemented method of Clause 13, wherein the first packet and a subsequent packet correspond to a same routing rule.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A computing system, comprising:
   a first network environment associated with a first customer of a cloud computing environment, wherein the first network environment is a virtual private network environment;
   a second network environment;
   a network appliance; and
   a stateful network routing service configured to route data between the first network environment and the second network environment through the network appliance, the stateful network routing service configured to:
   receive a packet from the first network environment, the packet corresponding to a flow of network traffic between the first network environment and the second network environment, wherein the packet includes first flow information identifying the flow of network traffic,
   obtain a first flow identifier, wherein the first flow identifier is generated for the first flow information,
   add the first flow identifier to the packet to generate a first enriched packet,
   transmit the first enriched packet to the network appliance,
   receive a second enriched packet from the network appliance, wherein the second enriched packet includes a second flow identifier and second flow information,
   determine a validity of the second enriched packet, wherein the stateful network routing service is configured to route validated packets in accordance with a corresponding flow of network traffic and drop non-validated packets, wherein to determine the validity of the second enriched packet, the stateful network routing service is configured to:
      determine whether the first flow identifier of the first enriched packet matches the second flow identifier of the second enriched packet, and
      determine whether the first flow information of the packet and the second flow information of the second enriched packet correspond to the flow of network traffic,
   determine, in response to determining whether the first flow identifier of the first enriched packet matches the second flow identifier of the second enriched packet and determining whether the first flow information of the packet and the second flow information of the second enriched packet correspond to the flow of network traffic, whether to route the second enriched packet to the second network environment in accordance with the flow of network traffic or drop the second enriched packet, wherein to determine whether to route the second enriched packet to the second network environment, the stateful network routing service is configured to:
      detect that validation of the second enriched packet failed in response to i) determining that the first flow identifier of the first enriched packet does not match the second flow identifier of the second enriched packet or ii) determining that the second flow information of the second enriched packet does not correspond to the flow of network traffic, and
      determine that the second enriched packet corresponds to a session termination, and
   transmit the second enriched packet to the second network environment in accordance with the flow of network traffic, in response to determining that the second enriched packet corresponds to the session termination.

2. The system of claim 1, the stateful network routing service further configured to:
   receive a third enriched packet from the network appliance, wherein the third enriched packet includes a third flow identifier and third flow information;
   determine, in response to determining the first flow information of the packet and the third flow information of the third enriched packet correspond to the flow of network traffic and determining the third flow identifier of the third enriched packet does not match the first flow identifier of the first enriched packet, that an error has occurred in the flow of network traffic; and
   drop the third enriched packet in response to determining that the error has occurred in the flow of network traffic.

3. The system of claim 1, further comprising:
   a third network environment, wherein the third network environment is associated with a second customer; and the stateful network routing service further configured to:
receive a third enriched packet from the network appliance, wherein the third enriched packet includes a third flow identifier and third flow information, wherein the third flow information identifies a flow of network traffic between the third network environment and a fourth network environment,
determine, in response to determining the third flow identifier of the third enriched packet matches the first flow identifier of the first enriched packet and determining the third flow information of the third enriched packet and the first flow information of the packet correspond to different flows of network traffic, that an error has occurred, and
drop the third enriched packet in response to determining that the error has occurred.

4. The system of claim 1, the stateful network routing service further configured to:
determine that the flow of network traffic has been discontinued; and
remove the first flow identifier from a flow identifier data store.

5. A system comprising:
a data store including computer-executable instructions; and
one or more computing devices configured to execute the computer-executable instructions to implement a stateful network routing service, wherein execution of the computer-executable instructions causes the one or more computing devices to:
receive a packet from a first computing device, the packet corresponding to a flow of network traffic between the first computing device and a second computing device, the stateful network routing service configured to intercept network traffic between the first computing device and the second computing device, wherein the packet includes first flow information identifying the flow of network traffic,
obtain a first flow identifier, wherein the first flow identifier is generated for the first flow information,
add the first flow identifier to the packet to generate a first enriched packet,
transmit the first enriched packet to a network appliance,
receive a second enriched packet from the network appliance, wherein the second enriched packet includes a second flow identifier and second flow information,
determine a validity of the second enriched packet, wherein to determine the validity of the second enriched packet, execution of the computer-executable instructions causes the one or more computing devices to:
determine whether the first flow identifier of the first enriched packet matches the second flow identifier of the second enriched packet, and
determine whether the first flow information of the packet and the second flow information of the second enriched packet correspond to the flow of network traffic,
determine, in response to determining whether the first flow identifier of the first enriched packet matches the second flow identifier of the second enriched packet and determining whether the first flow information of the packet and the second flow information of the second enriched packet correspond to the flow of network traffic, whether to route the second enriched packet to the second computing device in accordance with the flow of network traffic or drop the second enriched packet, wherein to determine whether to route the second enriched packet to the second computing device, the execution of the computer-executable instructions further causes the one or more computing devices to:
detect that validation of the second enriched packet failed in response to i) determining that the first flow identifier of the first enriched packet does not match the second flow identifier of the second enriched packet or ii) determining that the second flow information of the second enriched packet does not correspond to the flow of network traffic, and
determine that the second enriched packet corresponds to a session termination, and
transmit the second enriched packet to the second computing device in accordance with the flow of network traffic in response to determining that the second enriched packet corresponds to the session termination.

6. The system of claim 5, further comprising one or more additional computing devices configured to implement a second stateful network routing service, wherein the one or more additional computing devices are configured to:
receive a third packet from the first computing device, the third packet corresponding to the flow of network traffic, wherein the third packet includes the first flow information;
obtain the first flow identifier;
add the first flow identifier to the third packet to generate a third enriched packet;
transmit the third enriched packet to the network appliance;
receive a fourth enriched packet from the network appliance, wherein the fourth enriched packet includes a fourth flow identifier and fourth flow information;
determine a validity of the fourth enriched packet, wherein to determine the validity of the fourth enriched packet, the one or more additional computing devices are configured to:
determine whether the first flow identifier of the third enriched packet matches the fourth flow identifier of the fourth enriched packet, and
determine whether the first flow information of the third packet and the fourth flow information of the fourth enriched packet correspond to the flow of network traffic; and
determine, in response to determining whether the first flow identifier of the third enriched packet matches the fourth flow identifier of the fourth enriched packet and determining whether the first flow information of the third packet and the fourth flow information of the fourth enriched packet correspond to the flow of network traffic, whether to route the fourth enriched packet to the second computing device in accordance with the flow of network traffic or drop the fourth enriched packet.

7. The system of claim 5, wherein the first flow identifier is stored in a primary flow identifier data store and a secondary flow identifier data store, and wherein the one or more computing devices are configured to obtain the first flow identifier from the secondary flow identifier data store when the primary flow identifier data store is unavailable.

8. The system of claim 5, wherein execution of the computer-executable instructions further causes the one or more computing devices to:
compare the first flow information with a plurality of flow information; and
determine that the first flow identifier has not been previously generated for the first flow information based at least on comparing the first flow information with the plurality of flow information;
wherein obtaining the first flow identifier comprises generating the first flow identifier based at least in part on the flow of network traffic.

9. The system of claim 5, wherein execution of the computer-executable instructions further causes the one or more computing devices to:
compare the first flow information with a plurality of flow information; and
determine that the first flow identifier has been previously generated for the first flow information based at least on comparing the first flow information with the plurality of flow information;
wherein obtaining the first flow identifier comprises obtaining the first flow identifier from a flow identifier data store.

10. The system of claim 5, wherein the first flow identifier comprises one or more randomly assigned numbers.

11. The system of claim 5, wherein execution of the computer-executable instructions further causes the one or more computing devices to:
determine that the flow of network traffic been discontinued; and
remove the first flow identifier from a flow identifier data store.

12. The system of claim 5, wherein the system is a multi-tenant system.

13. The system of claim 5, wherein execution of the computer-executable instructions further causes the one or more computing devices to:
receive a third packet from the first computing device, the third packet corresponding to the flow of network traffic, wherein the third packet includes the first flow information;
obtain the first flow identifier;
add the first flow identifier to the third packet to generate a third enriched packet;
transmit the third enriched packet to the network appliance;
receive a fourth enriched packet from the network appliance, wherein the fourth enriched packet includes a fourth flow identifier and fourth flow information;
determine, in response to determining the first flow information of the third packet and the fourth flow information of the fourth enriched packet correspond to the flow of network traffic and determining the fourth flow identifier of the fourth enriched packet does not match the first flow identifier of the third enriched packet, that an error has occurred; and
drop the fourth enriched packet.

14. A method implemented by one or more computing devices that implement a stateful network routing service, the method comprising:
intercepting a packet over a network, the packet corresponding to a flow of network traffic between a first computing device and a second computing device, wherein the packet includes first flow information identifying the flow of network traffic;
obtaining a first flow identifier corresponding to the first flow information;
adding the first flow identifier to the packet to generate a first enriched packet;
transmitting the first enriched packet to a network appliance;
receiving a second enriched packet from the network appliance; wherein the second enriched packet includes a second flow identifier and second flow information;
determining a validity of the second enriched packet by:
determining whether the first flow identifier of the first enriched packet matches the second flow identifier of the second enriched packet, and
determining whether the first flow information of the packet and the second flow information of the second enriched packet correspond to the flow of network traffic;
determining, in response to determining whether the first flow identifier of the first enriched packet matches the second flow identifier of the second enriched packet and determining whether the first flow information of the packet and the second flow information of the second enriched packet correspond to the flow of network traffic, whether to route the second enriched packet to the second computing device in accordance with the flow of network traffic or drop the second enriched packet, wherein determining whether to route the second enriched packet to the second computing device comprises:
detecting that validation of the second enriched packet failed in response to i) determining that the first flow identifier of the first enriched packet does not match the second flow identifier of the second enriched packet or ii) determining that the second flow information of the second enriched packet does not correspond to the flow of network traffic, and
determining that the second enriched packet corresponds to a session termination; and
transmitting the second enriched packet to the second computing device in accordance with the flow of network traffic in response to determining that the second enriched packet corresponds to the session termination.

15. The method of claim 14, wherein obtaining the first flow identifier comprises at least one of:
generating a flow identifier; or
obtaining a previously generated flow identifier.

16. The method of claim 14 further comprising:
determining that the flow of network traffic has been discontinued; and
removing the first flow identifier from a data store.

17. The method of claim 14 further comprising:
receiving a third packet from the first computing device, the third packet corresponding to the flow of network traffic, wherein the third packet includes the first flow information;
obtaining the first flow identifier;
adding the first flow identifier to the third packet to generate a third enriched packet;
transmitting the third enriched packet to the network appliance;
receiving a fourth enriched packet from the network appliance, wherein the fourth enriched packet includes a fourth flow identifier and fourth flow information;
determining, in response to determining the first flow information of the third packet and the fourth flow information of the fourth enriched packet correspond to the flow of network traffic and determining the fourth flow identifier of the fourth enriched packet does not match the first flow identifier of the third enriched packet, that an error has occurred; and dropping the fourth enriched packet.

* * * * *